United States Patent
Sakai et al.

(10) Patent No.: US 9,450,680 B2
(45) Date of Patent: Sep. 20, 2016

(54) OPTICAL COMMUNICATION SYSTEM, OPTICAL TRANSMITTER, AND OPTICAL RECEIVER

(71) Applicant: Fujitsu Optical Components Limited, Kawasaki-shi, Kanagawa (JP)

(72) Inventors: Yoshio Sakai, Kawasaki (JP); Tamotsu Akashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 77 days.

(21) Appl. No.: 14/254,161

(22) Filed: Apr. 16, 2014

(65) Prior Publication Data
US 2014/0328588 A1 Nov. 6, 2014

(30) Foreign Application Priority Data
May 1, 2013 (JP) ................................. 2013-096570

(51) Int. Cl.
*H04B 10/2507* (2013.01)
*H04B 10/08* (2006.01)
*H04J 14/06* (2006.01)
*H04B 10/63* (2013.01)
*H04B 10/61* (2013.01)

(52) U.S. Cl.
CPC .......... *H04B 10/63* (2013.01); *H04B 10/6164* (2013.01)

(58) Field of Classification Search
CPC  H04B 10/63; H04B 10/6164; H04B 10/616; H04B 10/611
USPC ................................................ 398/38, 25, 9
See application file for complete search history.

(56) References Cited

U.S. PATENT DOCUMENTS

| | | | | |
|---|---|---|---|---|
| 8,036,541 B2* | 10/2011 | Toyoshima | ............ | H04B 10/61 398/202 |
| 2008/0145066 A1* | 6/2008 | Hoshida | ............... | H04B 10/61 398/205 |
| 2008/0205499 A1* | 8/2008 | Ridel | ...................... | H04L 5/023 375/222 |
| 2009/0317092 A1* | 12/2009 | Nakashima | ............ | H04B 10/61 398/204 |
| 2010/0111544 A1* | 5/2010 | Oda | ........................ | H04B 10/60 398/204 |
| 2012/0237211 A1 | 9/2012 | Iizuka et al. | | |
| 2013/0181757 A1* | 7/2013 | Calabro | ................ | H04L 7/0029 327/159 |

(Continued)

FOREIGN PATENT DOCUMENTS

| JP | 2009-60309 | 3/2009 |
|---|---|---|
| JP | 2010-109847 | 5/2010 |
| JP | 2012-195688 | 10/2012 |

OTHER PUBLICATIONS

H. Nakashima et al., "Novel Wide-range Frequency Offset Compensator Demonstrated with Real-time Digital Coherent Receiver," *European Conference on Optical Communication 2008*, Sep. 2008, pp. 1-2.

(Continued)

*Primary Examiner* — Oommen Jacob
(74) *Attorney, Agent, or Firm* — Staas & Halsey LLP

(57) ABSTRACT

An optical communication system includes an optical transmitter, and an optical receiver connected via a transmission line to the optical transmitter, in which system the optical transmitter transmits a continuous-wave light signal that enables beat detection when combined with a local oscillator signal in the optical receiver, and the optical receiver acquires a beat waveform through digital sampling by detecting the light signal using the local oscillator signal, performs frequency analysis on digitally sampled data having the beat waveform prior to demodulation, and controls the local oscillator frequency based upon the beat frequency.

9 Claims, 31 Drawing Sheets

(56) References Cited

U.S. PATENT DOCUMENTS

| | | | |
|---|---|---|---|
| 2014/0186024 A1* | 7/2014 | Randel | H04B 10/616 398/25 |
| 2014/0328588 A1* | 11/2014 | Sakai | H04B 10/63 398/38 |
| 2015/0023674 A1* | 1/2015 | Salsi | H04B 10/61 398/202 |

OTHER PUBLICATIONS

Patent Abstracts of Japan, Publication No. 2009-060309, Published Mar. 19, 2009.

P. J. Winzer et al., "56-Gbaud PDM-QPSK: Coherent Detection and 2,500-km Transmission," *European Conference on Optical Communication 2009*, Sep. 2009, 2 pages.

Patent Abstracts of Japan, Publication No. 2010-109847, Published May 13, 2010.

S. Perrin, "White Paper: Building a Fully Flexible Optical Layer with Next-Generation ROADMs," *Heavy Reading*, Oct. 2011, pp. 2-18 and cover sheet.

Patent Abstracts of Japan, Publication No. 2012-195688, Published Oct. 11, 2012.

Chinese Office Action dated Apr. 21, 2016 in corresponding Chinese Patent Application No. 201410183251.8.

* cited by examiner

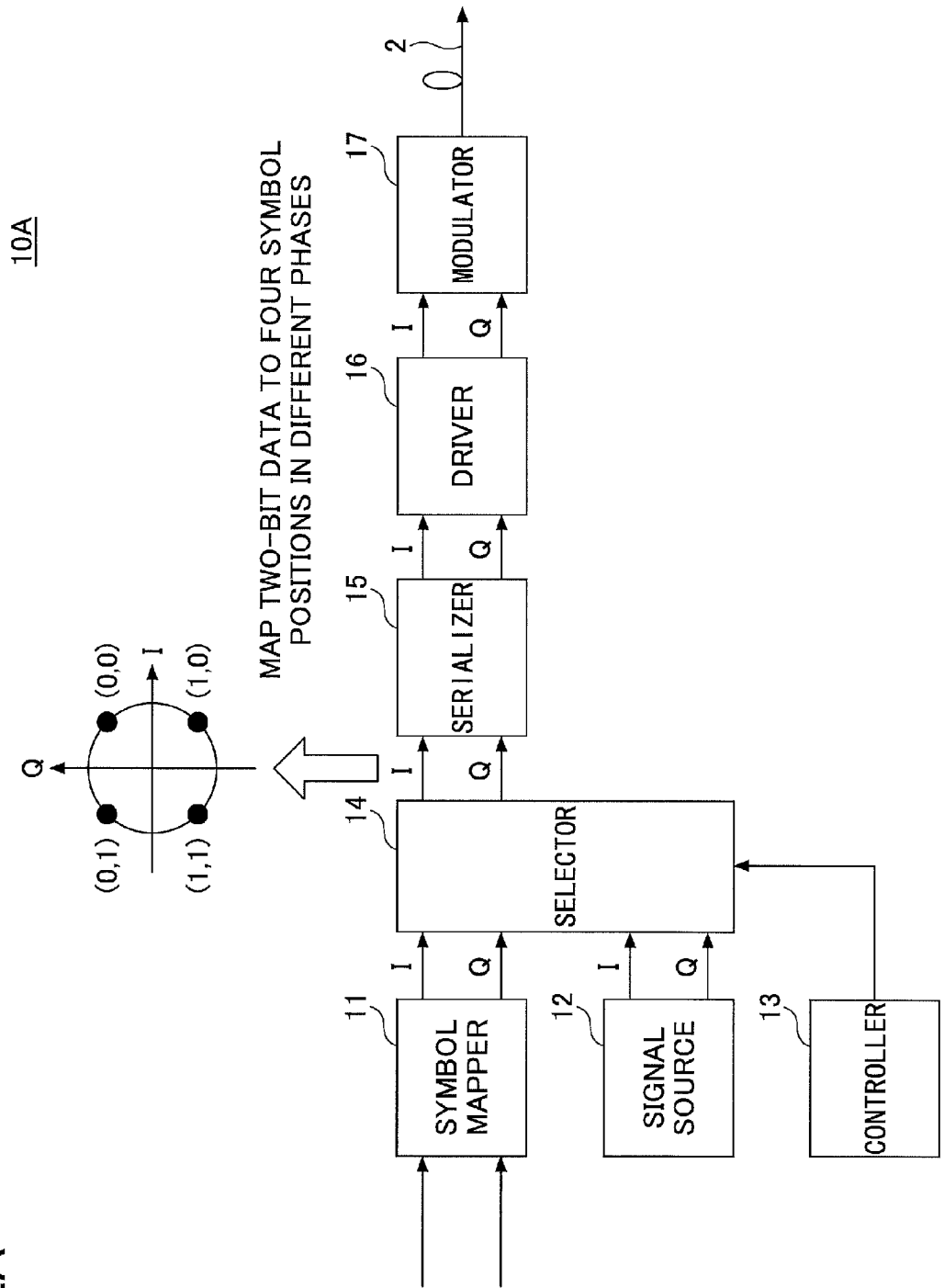

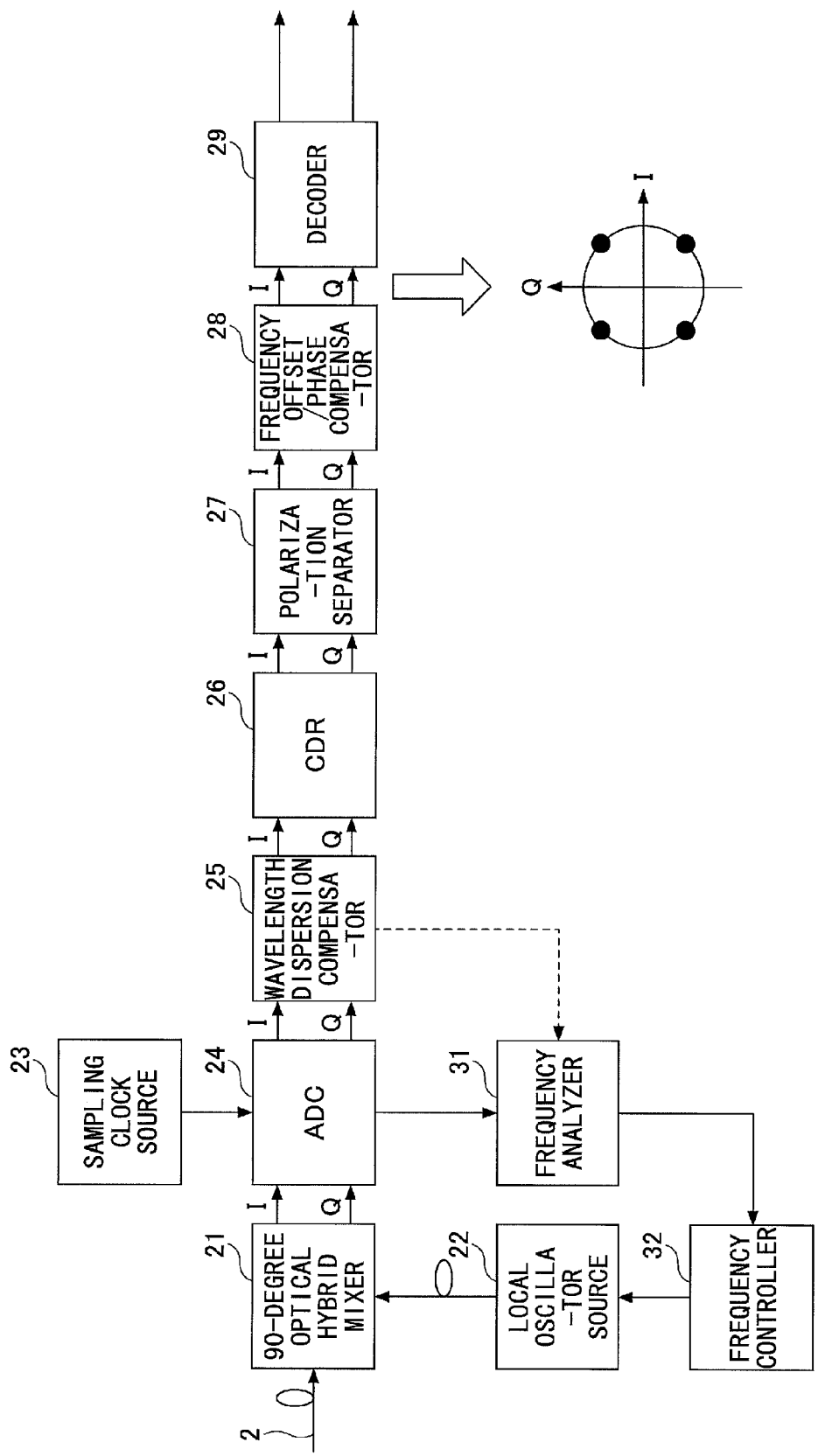

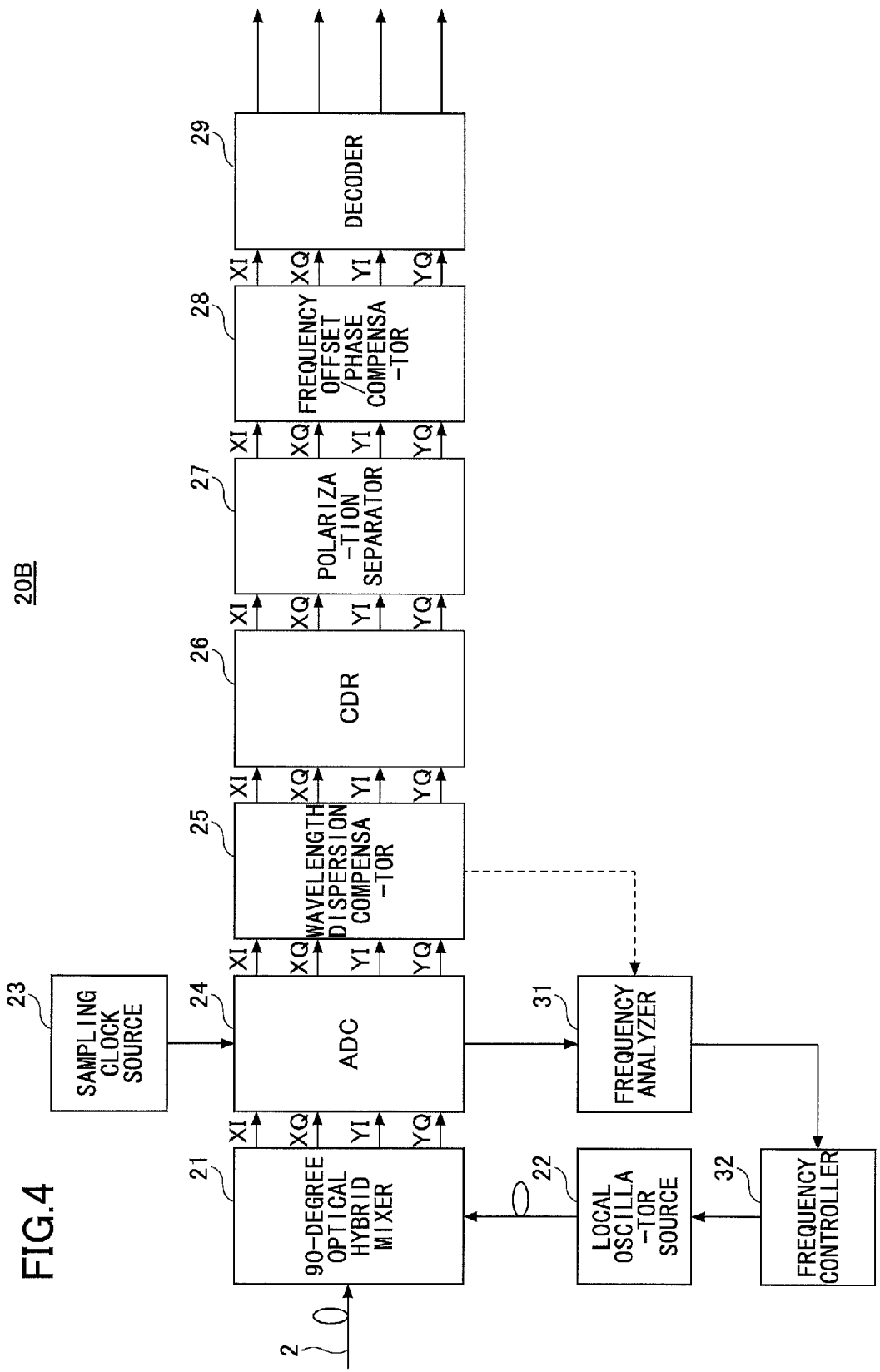

| RECEIVED LIGHT POWER | LOCAL OSCILLATOR POWER LEVEL | TIA GAIN | BEAT FREQUENCY | THRESHOLD P |
|---|---|---|---|---|
| P_S1 | P_L1 | G1 | f_beat1 | P1 |
| P_S1 | P_L1 | G1 | f_beat2 | P2 |
| P_S1 | P_L1 | G1 | f_beat3 | P3 |
| P_S1 | P_L1 | G1 | f_beat4 | P4 |
| P_S1 | P_L1 | G2 | f_beat1 | P5 |
| P_S1 | P_L1 | G2 | f_beat2 | P6 |
| P_S1 | P_L1 | G2 | f_beat3 | P7 |
| P_S1 | P_L1 | G2 | f_beat4 | P8 |
| P_S1 | P_L1 | G3 | f_beat1 | P9 |
| P_S1 | P_L1 | G3 | f_beat2 | P10 |
| P_S1 | P_L1 | G3 | f_beat3 | P11 |
| P_S1 | P_L1 | G3 | f_beat4 | P12 |
| P_S1 | P_L1 | G4 | f_beat1 | P13 |
| P_S1 | P_L1 | G4 | f_beat2 | P14 |
| P_S1 | P_L1 | G4 | f_beat3 | P15 |
| P_S1 | P_L1 | G4 | f_beat4 | P16 |
| P_S1 | P_L2 | G1 | f_beat1 | P17 |
| P_S1 | P_L2 | G1 | f_beat2 | P18 |
| P_S1 | P_L2 | G1 | f_beat3 | P19 |
| P_S1 | P_L2 | G1 | f_beat4 | P20 |
| P_S1 | P_L2 | G2 | f_beat1 | P21 |
| P_S1 | P_L2 | G2 | f_beat2 | P22 |
| P_S1 | P_L2 | G2 | f_beat3 | P23 |
| P_S1 | P_L2 | G2 | f_beat4 | P24 |
| P_S1 | P_L2 | G3 | f_beat1 | P25 |
| P_S1 | P_L2 | G3 | f_beat2 | P26 |
| P_S1 | P_L2 | G3 | f_beat3 | P27 |
| P_S1 | P_L2 | G3 | f_beat4 | P28 |
| P_S1 | P_L2 | G4 | f_beat1 | P29 |
| P_S1 | P_L2 | G4 | f_beat2 | P30 |
| P_S1 | P_L2 | G4 | f_beat3 | P31 |
| P_S1 | P_L2 | G4 | f_beat4 | P32 |
| P_S2 | P_L1 | G1 | f_beat1 | P33 |
| P_S2 | P_L1 | G1 | f_beat2 | P34 |
| P_S2 | P_L1 | G1 | f_beat3 | P35 |
| P_S2 | P_L1 | G1 | f_beat4 | P36 |
| P_S2 | P_L1 | G2 | f_beat1 | P37 |
| P_S2 | P_L1 | G2 | f_beat2 | P38 |
| ⋮ | ⋮ | ⋮ | ⋮ | ⋮ |

| RECEIVED LIGHT POWER | LOCAL OSCILLATOR POWER LEVEL | TIA GAIN | BEAT FREQUENCY | THRESHOLD P1 | ... | THRESHOLD PN |
|---|---|---|---|---|---|---|
| P_S1 | P_L1 | G1 | f_beat1 | P1_1 | | PN_1 |
| P_S1 | P_L1 | G1 | f_beat2 | P1_2 | | PN_2 |
| P_S1 | P_L1 | G1 | f_beat3 | P1_3 | | PN_3 |
| P_S1 | P_L1 | G1 | f_beat4 | P1_4 | | PN_4 |
| P_S1 | P_L1 | G2 | f_beat1 | P1_5 | | PN_5 |
| P_S1 | P_L1 | G2 | f_beat2 | P1_6 | | PN_6 |
| P_S1 | P_L1 | G2 | f_beat3 | P1_7 | | PN_7 |
| P_S1 | P_L1 | G2 | f_beat4 | P1_8 | | PN_8 |
| P_S1 | P_L1 | G3 | f_beat1 | P1_9 | | PN_9 |
| P_S1 | P_L1 | G3 | f_beat2 | P1_10 | | PN_10 |
| P_S1 | P_L1 | G3 | f_beat3 | P1_11 | | PN_11 |
| P_S1 | P_L1 | G3 | f_beat4 | P1_12 | | PN_12 |
| P_S1 | P_L1 | G4 | f_beat1 | P1_13 | | PN_13 |
| P_S1 | P_L1 | G4 | f_beat2 | P1_14 | | PN_14 |
| P_S1 | P_L1 | G4 | f_beat3 | P1_15 | | PN_15 |
| P_S1 | P_L1 | G4 | f_beat4 | P1_16 | | PN_16 |
| P_S1 | P_L2 | G1 | f_beat1 | P1_17 | | PN_17 |
| P_S1 | P_L2 | G1 | f_beat2 | P1_18 | | PN_18 |
| P_S1 | P_L2 | G1 | f_beat3 | P1_19 | | PN_19 |
| P_S1 | P_L2 | G1 | f_beat4 | P1_20 | ... | PN_20 |
| P_S1 | P_L2 | G2 | f_beat1 | P1_21 | | PN_21 |
| P_S1 | P_L2 | G2 | f_beat2 | P1_22 | | PN_22 |
| P_S1 | P_L2 | G2 | f_beat3 | P1_23 | | PN_23 |
| P_S1 | P_L2 | G2 | f_beat4 | P1_24 | | PN_24 |
| P_S1 | P_L2 | G3 | f_beat1 | P1_25 | | PN_25 |
| P_S1 | P_L2 | G3 | f_beat2 | P1_26 | | PN_26 |
| P_S1 | P_L2 | G3 | f_beat3 | P1_27 | | PN_27 |
| P_S1 | P_L2 | G3 | f_beat4 | P1_28 | | PN_28 |
| P_S1 | P_L2 | G4 | f_beat1 | P1_29 | | PN_29 |
| P_S1 | P_L2 | G4 | f_beat2 | P1_30 | | PN_30 |
| P_S1 | P_L2 | G4 | f_beat3 | P1_31 | | PN_31 |
| P_S1 | P_L2 | G4 | f_beat4 | P1_32 | | PN_32 |
| P_S2 | P_L1 | G1 | f_beat1 | P1_33 | | PN_33 |
| P_S2 | P_L1 | G1 | f_beat2 | P1_34 | | PN_34 |
| P_S2 | P_L1 | G1 | f_beat3 | P1_35 | | PN_35 |
| P_S2 | P_L1 | G1 | f_beat4 | P1_36 | | PN_36 |
| P_S2 | P_L1 | G2 | f_beat1 | P1_37 | | PN_37 |
| P_S2 | P_L1 | G2 | f_beat2 | P1_38 | | PN_38 |
| ⋮ | ⋮ | ⋮ | ⋮ | ⋮ | | ⋮ |

| BEAT FREQUENCY | BEAT AMPLITUDE | THRESHOLD P |
|---|---|---|
| f_beat1 | Ab1 | P1 |
| f_beat1 | Ab2 | P2 |
| f_beat1 | Ab3 | P3 |
| f_beat1 | Ab4 | P4 |
| f_beat2 | Ab1 | P5 |
| f_beat2 | Ab2 | P6 |
| f_beat2 | Ab3 | P7 |
| f_beat2 | Ab4 | P8 |
| f_beat3 | Ab1 | P9 |
| f_beat3 | Ab2 | P10 |
| ⋮ | ⋮ | ⋮ |

| BEAT FREQUENCY | BEAT AMPLITUDE | THRESHOLD P | THRESHOLD P1 | ... | THRESHOLD PN |
|---|---|---|---|---|---|
| f_beat1 | Ab1 | P1 | P1_1 | | PN_1 |
| f_beat1 | Ab2 | P2 | P1_2 | | PN_2 |
| f_beat1 | Ab3 | P3 | P1_3 | | PN_3 |
| f_beat1 | Ab4 | P4 | P1_4 | | PN_4 |
| f_beat2 | Ab1 | P5 | P1_5 | | PN_5 |
| f_beat2 | Ab2 | P6 | P1_6 | ... | PN_6 |
| f_beat2 | Ab3 | P7 | P1_7 | | PN_7 |
| f_beat2 | Ab4 | P8 | P1_8 | | PN_8 |
| f_beat3 | Ab1 | P9 | P1_9 | | PN_9 |
| f_beat3 | Ab2 | P10 | P1_10 | | PN_10 |
| ⋮ | ⋮ | ⋮ | ⋮ | | ⋮ |

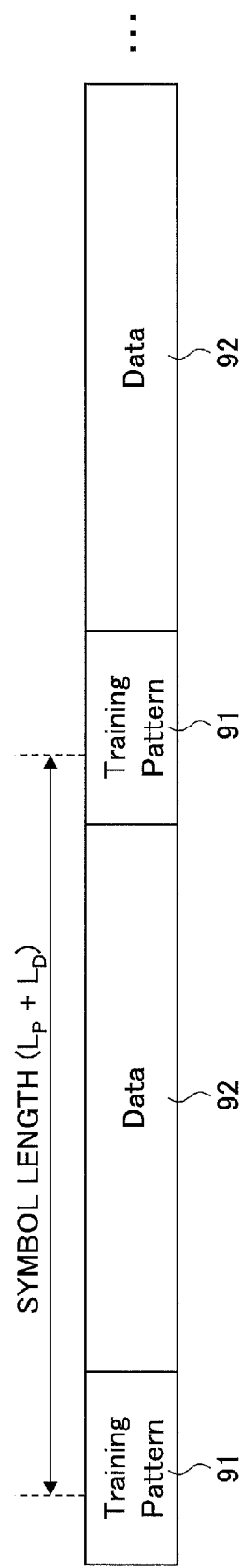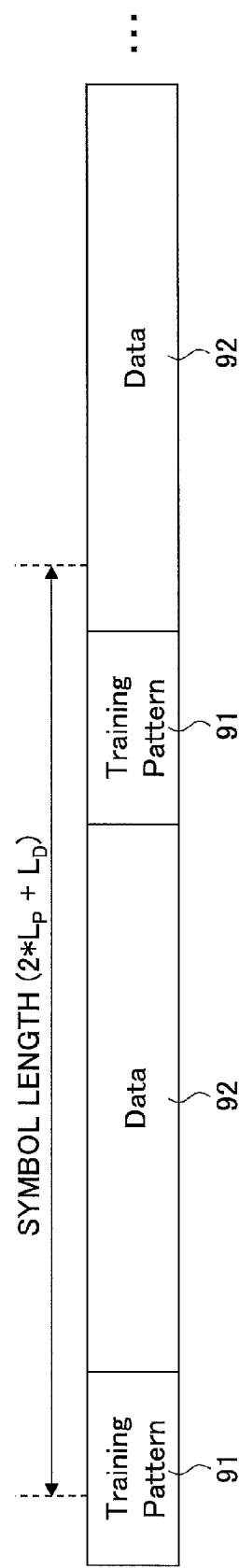

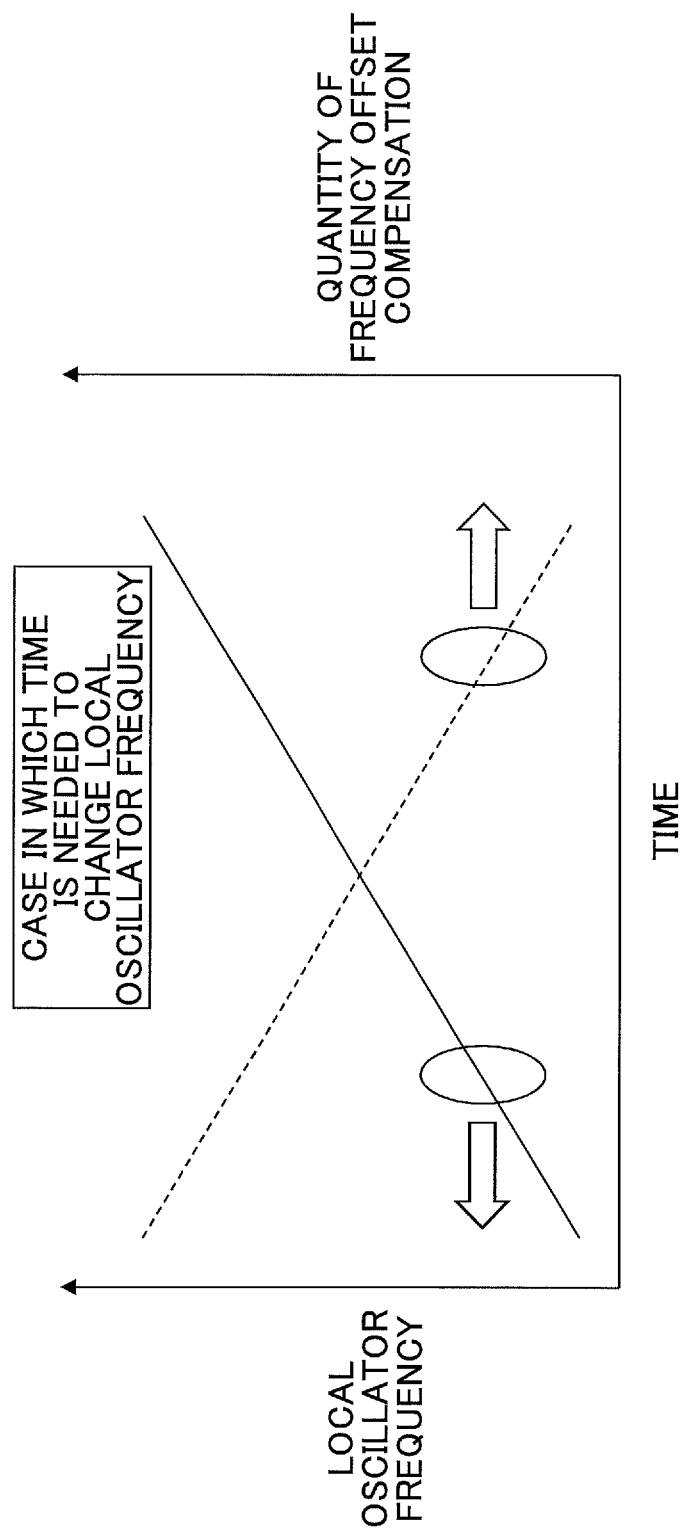

OPTICAL COMMUNICATION SYSTEM, OPTICAL TRANSMITTER, AND OPTICAL RECEIVER

CROSS REFERENCE TO RELATED APPLICATIONS

This application is based upon and claims benefit of priority of Japanese Patent Application No. 2013-096570 filed May 1, 2013, which is incorporated herein by reference in its entirety.

FIELD

The embodiments discussed herein are related to an optical communication system, and to an optical transmitter and an optical receiver used in the optical communication system.

BACKGROUND

In coherent optical communication using homodyne detection, transmission signal frequency at a sender side and a local oscillator frequency at a receiver side have to agree with each other. It is technically difficult to bring light frequencies into complete agreement with each other. In an optical receiver, clock pulses are produced synchronized with data, based upon feedback signals from a digital signal processor, to sample data at the clock frequency. See, for example, Japanese Patent Laid-open Publication No. 2009-60309. However, if a signal is phase-modulated, the phase of the light wave may change depending on the signal component. In this case, a sine wave may not be acquired even if the received signal is mixed with a signal from a local oscillator, and frequency offset between the light source of the sender side and the local oscillator cannot be detected.

Conventional clock extraction circuits are designed under the assumption that a constant envelope phase modulation scheme such as binary phase shift keying (BPSK), differential phase shift keying (DPSK), or quadrature phase shift keying (QPSK) is employed. When using a multi-level phase modulation such as 16 quadrature amplitude modulation (16-QAM) or 64-QAM with multiple levels in the amplitude direction, the multiplication result from a coupler provides multiple values (e.g., four amplitude levels when employing 16-QAM). Accordingly, a clock extraction circuit designed for intensity modulation cannot extract a clock pulse.

Intra-dyne coherent detection tolerates a slight amount of frequency offset between a sender-side light source and a receiver-side local oscillator. See, for example, P. J. Winzer, et al., "56-Gbaud PDM-QPSK: Coherent Detection And 2,500-km Transmission", ECOC 2009. With intra-dyne coherent detection, symbol rotation (phase rotation) occurs due to a frequency difference between the sender-side light source and the receiver-side local oscillator, as illustrated in FIG. 1A. To compensate for the symbol rotation, a digital signal processor creates an inverse rotation as illustrated in FIG. 1B, and stops the rotation at the symbol positions illustrated in FIG. 1C. If the local oscillator frequency changes during the compensation for the symbol rotation, the frequency difference estimated from the symbol rotation also varies. Consequently, the phase rotation transiently deviates from the frequency offset compensation value estimated at the digital signal processor, and burst error is caused. Besides, when the local oscillator frequency changes, the phase of a data signal also changes and the clock extraction circuit may malfunction.

A technique for broadening a frequency offset compensation range is proposed. See, for example, "Novel Wide-range Frequency Offset Compensator Demonstrated with Real-time Digital coherent Receiver", H. Nakashima et al., ECOC 2008. This technique is called Pre-decision-based angle differential frequency offset estimator (PADE) algorithm. PADE can broaden the compensation range; however, Q penalty becomes large as the frequency offset increases. It is confirmed that Q-factor penalty occurs even if ideal frequency offset compensation is performed.

It is expected that, in a feature optical network, flexible grid technology with variable frequency-grid intervals or ultimately, gridless technology without frequency grid is widely used. See, for example, "Building a Fully Flexible Optical Layer with Next-Generation ROADMs", HEAVY READING, Oct. 2011, White Paper. In variable-grid or gridless communications, optical signals cannot be received even if digital signal processing using PADE is employed.

It is desired to provide an optical communication technique that can bring a local oscillator frequency into agreement with or close to a transmitter light source to establish communications and reduce Q-factor penalty due to frequency offset, regardless of a modulation scheme.

SUMMARY

According to an aspect of the embodiment, an optical communication system is provided. The system includes an optical transmitter, and an optical receiver connected via a transmission line to the optical transmitter. The optical transmitter transmits a continuous-wave light signal that enables beat detection when combined with a local oscillator signal in the optical receiver. The optical receiver acquires a beat waveform through digital sampling by detecting the light signal using the local oscillator signal, performs frequency analysis on digitally sampled data having the beat waveform prior to demodulation, and controls the local oscillator frequency based upon the beat frequency.

The objects and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 2A is a schematic diagram of an optical transmitter used in an optical communication system according to the first embodiment;

FIG. 3 is a schematic diagram of an optical receiver used in the optical communication system according to the first embodiment;

FIG. 4 is a schematic diagram of an optical receiver used in the optical communication system according to the first embodiment;

FIG. 13 is an example of a threshold table used to determine if the detected signal is a transmission signal from a sender side;

FIG. 17 is a modification of the threshold table of FIG. 13;

FIG. 18A is another modification of the threshold table of FIG. 13;

FIG. 18B is still another modification of the threshold table of FIG. 13;

FIG. 22A is a diagram for explaining a symbol length of a signal acquired from the ADC of the optical receiver of FIG. 20;

FIG. 22B is a diagram for explaining a symbol length of the signal acquired from the ADC of the optical receiver of FIG. 20;

FIG. 26 is a diagram for explaining determination of the quantity of frequency offset compensation in accordance with frequency change of the local oscillator;

DESCRIPTION OF EMBODIMENTS

The embodiments are described below with reference to the attached drawings. In the embodiments, prior to establishment of communication, free-running (self-oscillating) sampling clocks are used in an ADC to sample input data with non-synchronous clocks, and sampled data are acquired from a functional block independent from a modulation scheme before demodulation. Frequency analysis is performed on the sampled data to detect beat frequency of the detected signal. Based upon the detected beat frequency, the local oscillator frequency is brought into agreement with or close to a frequency of a transmitter light source. This arrangement can control the local oscillator (LO) regardless of the modulation scheme and prevent malfunction (reducing Q-factor penalty).

<First Embodiment>

Figure 2B:
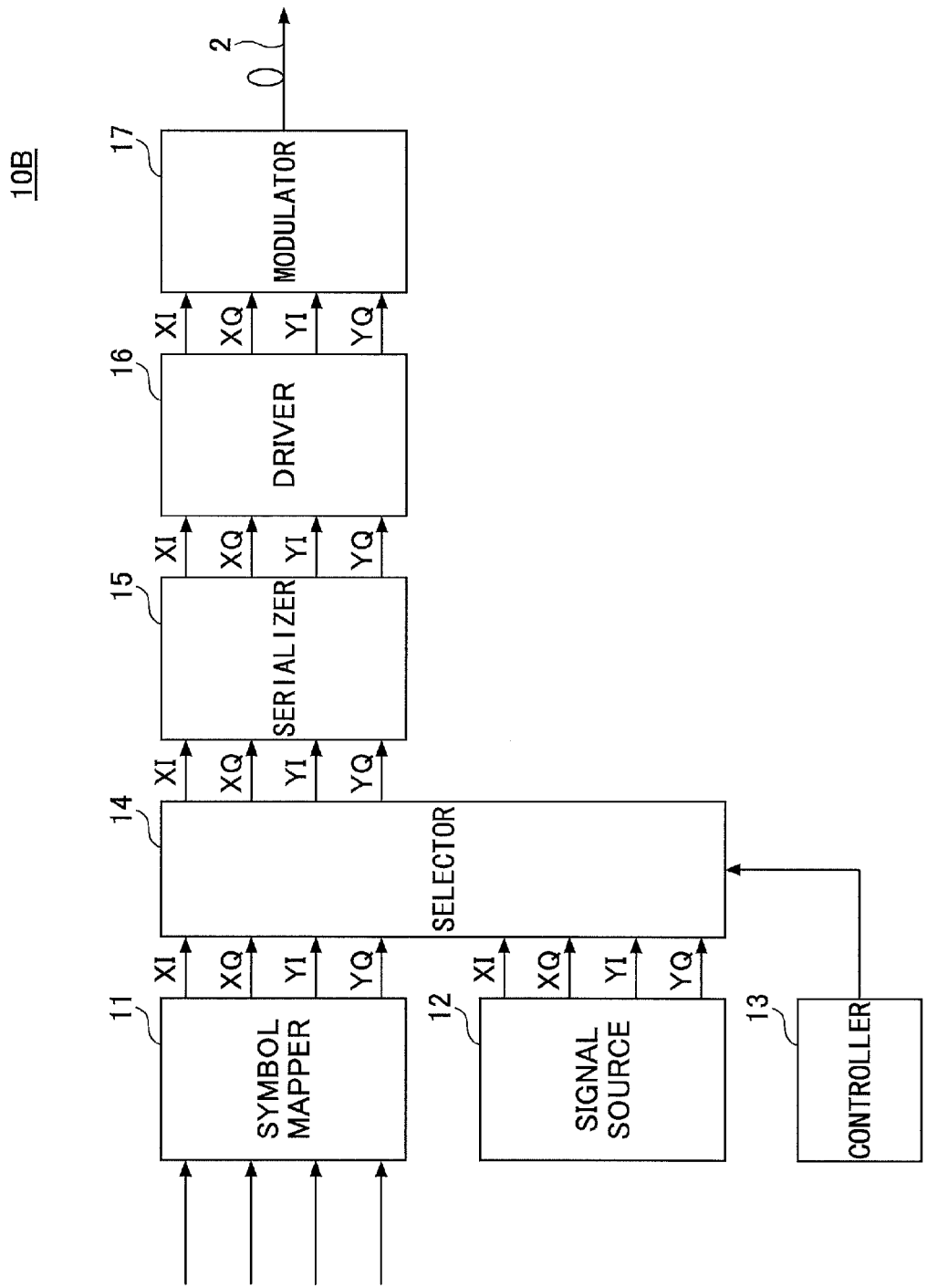
FIG. 2B is a schematic diagram of an optical transmitter used in the optical communication system according to the first embodiment.

FIG. 2A illustrates in a schematic block diagram a single polarization (SP) QPSK optical transmitter 10A, and FIG. 2B illustrates in a schematic block diagram a dual polarization (DP) QPSK optical transmitter 10B. FIG. 3 illustrates in a schematic block diagram a SP-QPSK optical receiver 20A, and FIG. 4 illustrates in a schematic diagram a DP-QPSK optical receiver.

The structures and the methods of the embodiments are applicable regardless of whether or not polarization division multiplexing is employed. The embodiments are also applicable to arbitrary modulation schemes, such as multi-level amplitude modulations, without being limited to QPSK. The methods and the structures of the embodiments are equally applied to a case with polarization division multiplexing (FIG. 2B and FIG. 4) and a case without polarization division multiplexing (FIG. 2A and FIG. 3). Accordingly, the optical transmitters 10A and 10B are referred to collectively as "optical transmitter 10", and the optical receivers 20A and 20B are referred to collectively as "optical receiver 20". In the following description, explanation is made taking the SP-QPSK optical transmitter 10A and the SP-QPSK optical receiver 20A for examples, and redundant explanation for the DP-QPSK transmitter and receiver is omitted.

In FIG. 2A, a selector 14 selects either one of outputs from a symbol mapper 11 or outputs from a signal source 12 under the control of a controller 13. The symbol mapper 11 receives 2-bit data and converts the data into four phase information items represented by an in-phase (I) component and a quadrature-phase (Q) component.

The selector 14 is designed to select the output from the signal source 12 when activated. The signal generated by the signal source 12 is a non-modulated signal (continuous wave) or a signal with a low degree of modulation. Light signals acquired from the non-modulated or low-modulated signals are described in more detail below with reference to FIGS. 5A-5C and FIGS. 6A-6C. If the selector 14 is not used, the symbol mapper 11 may be designed to output same data values for a predetermined period of time prior to the start of communication to generate a continuous wave.

The output of the selector 14 is connected to the input of the serializer 15. Because the selector 14 operates at a comparatively low rate, the output signal from the selector 14 is converted to a high-rate signal corresponding to a symbol rate by the serializer 15. In place of the serializer 15, a digital-to-analog converter (DAC) may be used. When using a DAC, the signal rate is increased to several times the symbol rate.

The output signal of the serializer 15 is amplified at a driver 16, and a drive signal generated from the driver 16 is used to drive the modulator 17. The modulator 17 is an arbitrary type of optical modulator such as a lithium niobate (LN) modulator or an optical modulator using semiconductor materials. The modulator 17 modulates a carrier wave generated by a light source (not illustrated) in accordance with the drive signal, and outputs a modulated light signal to the transmission line 2.

The optical transmitter 10B of FIG. 2B performs operations similar to those of the optical transmitter 10A of FIG. 2A, except for allocating four information items represented by two bits to an x-polarized light component and a y-polarized light component orthogonal to each other.

FIG. 3 illustrates an optical receiver 20A. A light signal received from the transmission line 2 is input to a 90-degree hybrid optical mixer 21, and detected using a light signal from a local oscillator source 22. The detected light signal is converted to an electric signal by a set of photodiodes and transimpedance amplifiers (not illustrated). The analog electric signal is sampled by an ADC 24 at a sampling clock generated by a sampling clock source 23. In general, sampling is performed at or above double rate of the symbol rate.

The sampled signal is supplied to a wavelength dispersion compensator 25 in which wavelength dispersion in the transmission path is compensated for. A clock and data recovery (CDR) 26 recovers a clock from the data. The output of the CDR 26 may be fed back to the ADC 24 or the sampling clock source 2 to regulate the frequency and the phase.

Figure 1A:
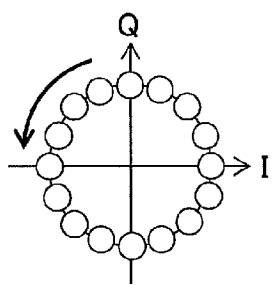
FIGS. 1A-1C are diagrams illustrating frequency offset compensation using digital signal processing.
Figure 1B:
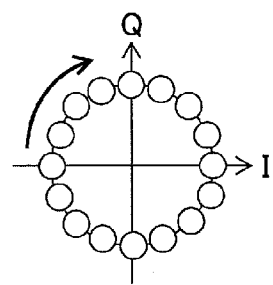
Figure 1C:
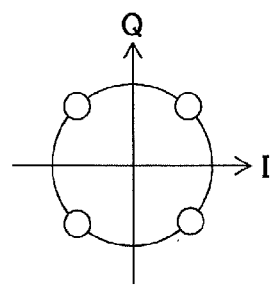

The output of the CDR 26 is connected to a polarization separator (or tracker) 27 in which the influence of polarization rotation is reduced. A frequency offset and phase (frequency offset/phase) compensator 28 compensates for frequency offset and phase offset between the transmitter light source and the local oscillator source 22. Through this operation, symbol positions are determined as illustrated in FIG. 1C. A decoder 29 performs inverse operations to the transmitter-side symbol mapping to decode data.

In one of the features of the embodiment, the sampling clock source 23 automatically oscillates for self-run at the time of startup, and the ADC 24 performs digital sampling on the light signal (CW wave or low-modulated wave) transmitted for local oscillator adjustment from the sender-side at a sampling clock which is non-synchronous with data sampling clocks. A portion of the digitally sampled signal is taken out of a pre-demodulation block, such as the ADC 24 or the wavelength dispersion compensator 25, which block is independent of a modulation scheme, and supplied to a frequency analyzer 31. In the following description, operations of the frequency analyzer 31 are explained using outputs of the ADC 24 as an example; however, outputs of the wavelength dispersion compensator 25 may be equally used as indicated by the dashed line.

At the ADC 24 of the optical receiver 20, the CW signal transmitted from the optical transmitter 10 is observed as a beat waveform in accordance with a frequency difference between the sender-side light source and the local oscillator source 22. The term "beat" represents a beat frequency generated when two sine waves with frequencies slightly different from each other are superimposed, which frequency is equivalent to the frequency difference between the two sine waves.

Figure 5A:
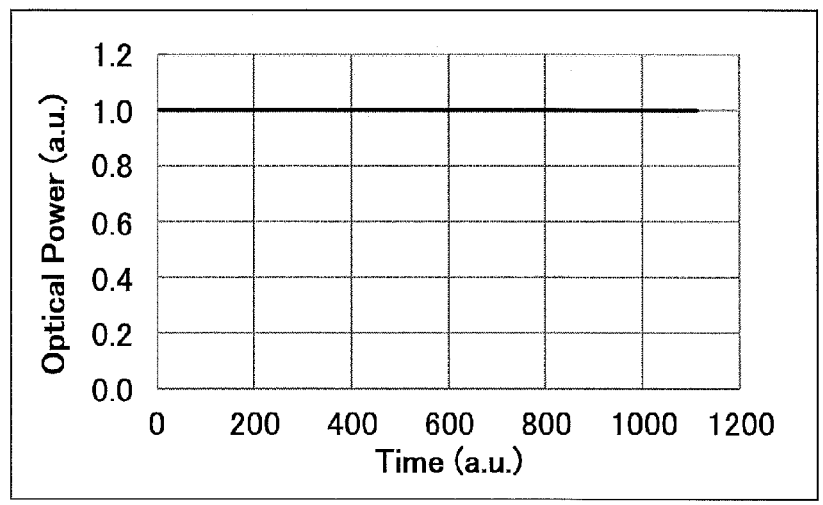
FIG. 5A illustrates a continuous wave (CW) signal transmitted from the optical transmitted and used for local oscillator adjustment at the optical receiver.
Figure 5B:
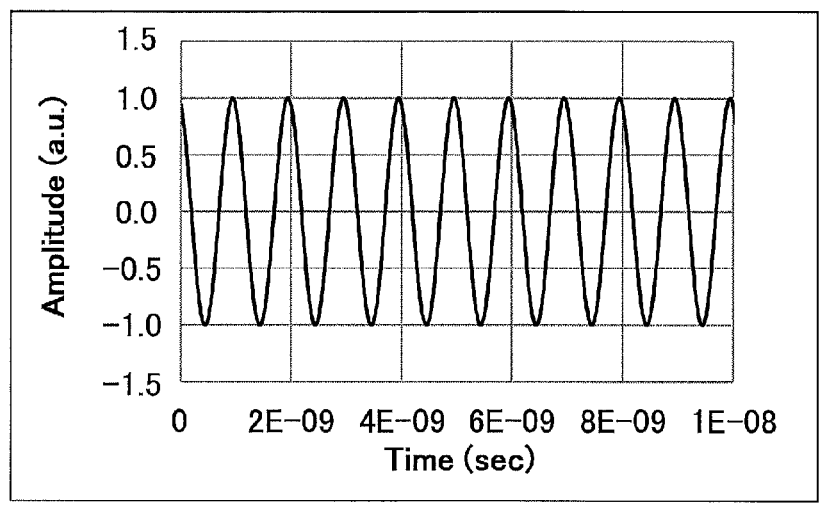
FIG. 5B illustrates a beat waveform obtained by sampling the detected CW signal at an analog-to-digital converter (ADC) of the optical receiver.
Figure 5C:
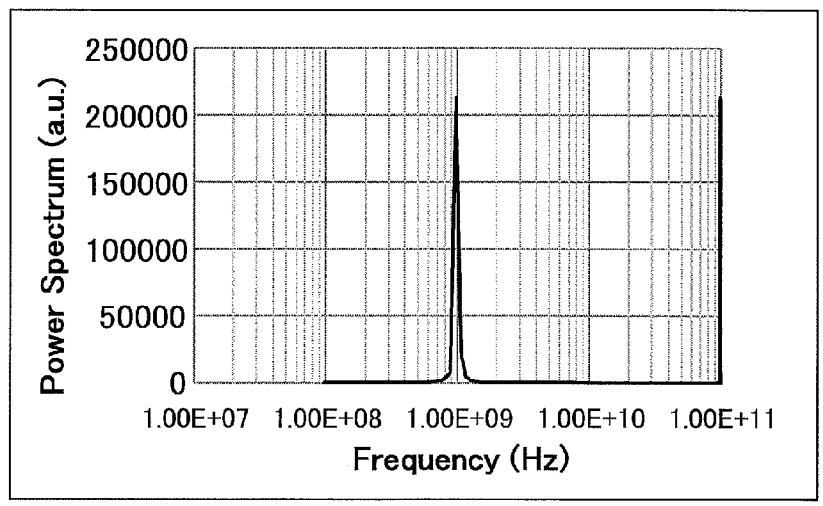
FIG. 5C illustrates a fast Fourier transform (FFT) computation result of the beat signal of FIG. 5B.

As illustrated in FIG. 5A, if a continuous wave of a constant power level is transmitted from the optical transmitter 10 without amplitude modulation, the sampled signal output from the ADC 24 of the optical receiver 20 has a beat waveform illustrated in FIG. 5B. In this example, the sampling rate of the ADC 24 is 100 gigasamples per second and the frequency offset (i.e., beat frequency) is 1 GHz. When Fast Fourier transform (FFT) computation is performed on this beat waveform at the frequency analyzer 31, the frequency offset of 1 GHz is detected as illustrated in FIG. 5C. In FIG. 5C, another signal component is also observed at 99 GHz. This component is a foldback component. The frequency offset can be correctly estimated by monitoring a frequency band at or below the Nyquist frequency (in this example, at or below 50 GHz).

Figure 6A:
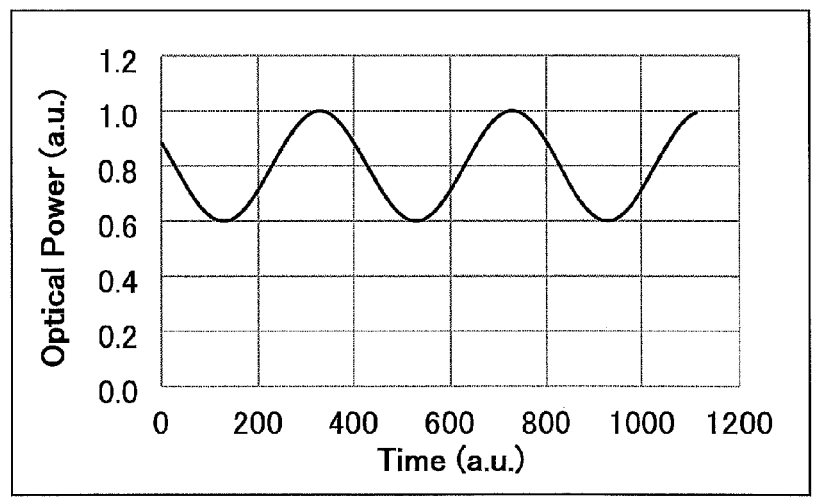
FIG. 6A illustrates a low-modulation signal transmitted from the optical transmitter and used for local oscillator adjustment at the optical receiver.
Figure 6B:
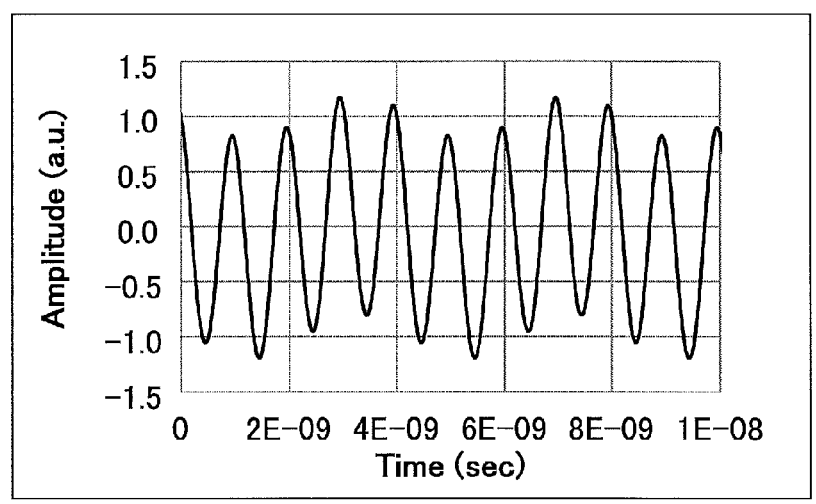
FIG. 6B illustrates a beat waveform obtained by sampling the detected low-modulation signal at the ADC of the optical receiver.
Figure 6C:
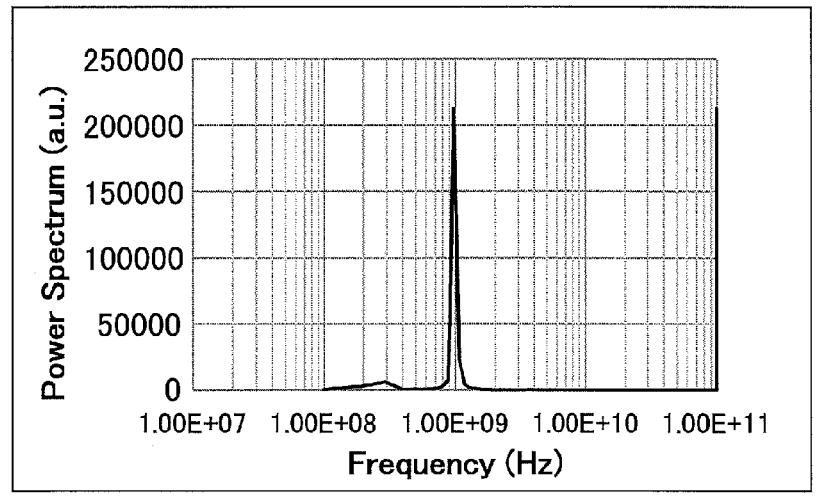
FIG. 6C illustrates a FFT computation result of the beat signal of FIG. 6B.

As illustrated in FIG. 6A, if a low-modulated continuous wave is transmitted from the optical transmitter 10, the sampled signal output from the ADC 24 of the optical receiver 20 has a beat waveform illustrated in FIG. 6B. In this example, the amplitude modulation rate is 250 MHz and the beat frequency is 1 GHz. The degree of the amplitude modulation applied at the sender side is lower than that for data modulation. When FFT computation is performed at the frequency analyzer 31 on the beat waveform obtained through the ADC 24, the frequency offset of 1 GHz is detected as illustrated in FIG. 6C.

The light signal for local oscillator adjustment transmitted from the optical transmitter 10 prior to establishment of communication may have an arbitrary waveform as long as a beat waveform is detected at the receiver side. Such light signal is not limited to the continuous wave exemplified in FIG. 5A or FIG. 6A.

In this example, the frequency analyzer 31 performs FFT computation at 1024 points. The number of sampling points may be increased to estimate frequency offset more accurately because the frequency resolution of FFT computation becomes higher as the number of sampling points increases. As long as the frequency analysis is performed, an arbitrary method other than FFT may be employed. If a lower frequency resolution is permitted, data decimation to thin out the sampled data from the ADC 24 may be performed or sampling frequency may be changed because the FFT frequency resolution is determined by the number of data points and the sampling frequency. The detected frequency offset is supplied to a frequency controller 32 to control the local oscillator source 22.

In the foregoing, the ADC 24 operates at a self-run clock, which is non-synchronous with a data clock, to acquire a sampling result. However, sampling data for frequency analysis may be acquired from the wavelength dispersion compensator 25 provided before the CDR 26, at a sampling clock non-synchronous with the data clock. In this case, sampling clocks automatically run (or self-run) because the CDR 26 cannot extract clocks at a beat frequency.

FIG. 4 illustrates an optical receiver 20B. The received light signal is split by a polarization splitter (not illustrated) into x-polarization and y-polarization, and input to a 90-degree hybrid optical mixer 21. The 90-degree hybrid optical mixer 32 detects a x-polarization component and a y-polarization component, using the x-polarization component and the y-polarization component of the local oscillator light. An in-phase (I) component and a quadrature (Q) component of each of the x-polarization component and the y-polarization component are output from the 90-degree optical mixer 21. Similarly to the optical receiver 20A of FIG. 3, the sampling clock source 23 runs automatically at the startup to drive the ADC 24 at non-synchronous sampling timing as data clocks for the purpose of adjustment for the local oscillator. Frequency analysis is performed to detect a beat frequency and the local oscillator source 22 is controlled based upon the beat frequency to bring the local oscillator frequency into agreement with or close to the frequency of the sender-side light source. These operations are the same as those performed in the optical receiver 20A of FIG. 3.

Figure 7:
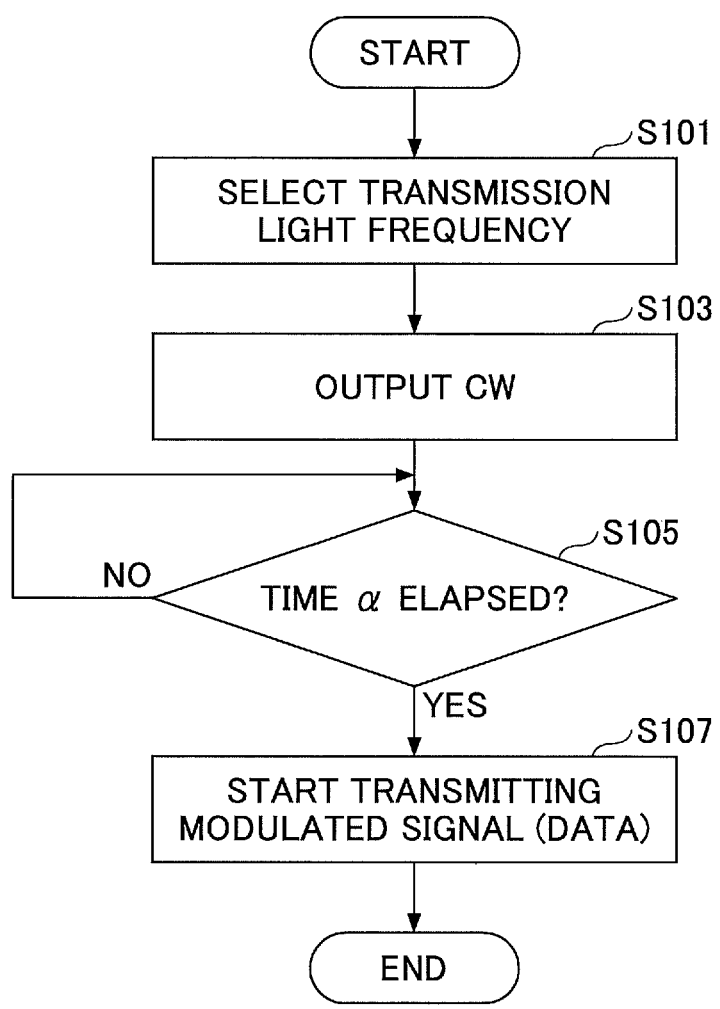
FIG. 7 is a flowchart illustrating basic operations of the optical transmitter according to the first embodiment.

FIG. 7 is a flowchart illustrating the operations performed by the optical transmitter 10. First, a transmission light frequency is selected (S101). The light source of the optical transmitter 10 emits light at the selected frequency. Prior to data transmission, the controller 13 (FIG. 2A or FIG. 2B) causes the optical transmitter 10 to transmit a non-modulated light signal (e.g., the CW illustrated in FIG. 5A) or a low-modulated light signal (e.g., the CW illustrated in FIG. 6A) for "α" periods of time (S103 and S105).

Since the frequency grid is 50 GHz or 100 GHz in ordinary optical communications, the transmission light frequency is set at either frequency interval. The time period "α" is a parameter determined taking into account the frequency analysis time or the local oscillator control time of the receiver side.

If time "α" has elapsed (Yes in S105), transmission of a modulated data signal is started (S107), and CW transmission for local oscillator adjustment is finished.

Figure 8:
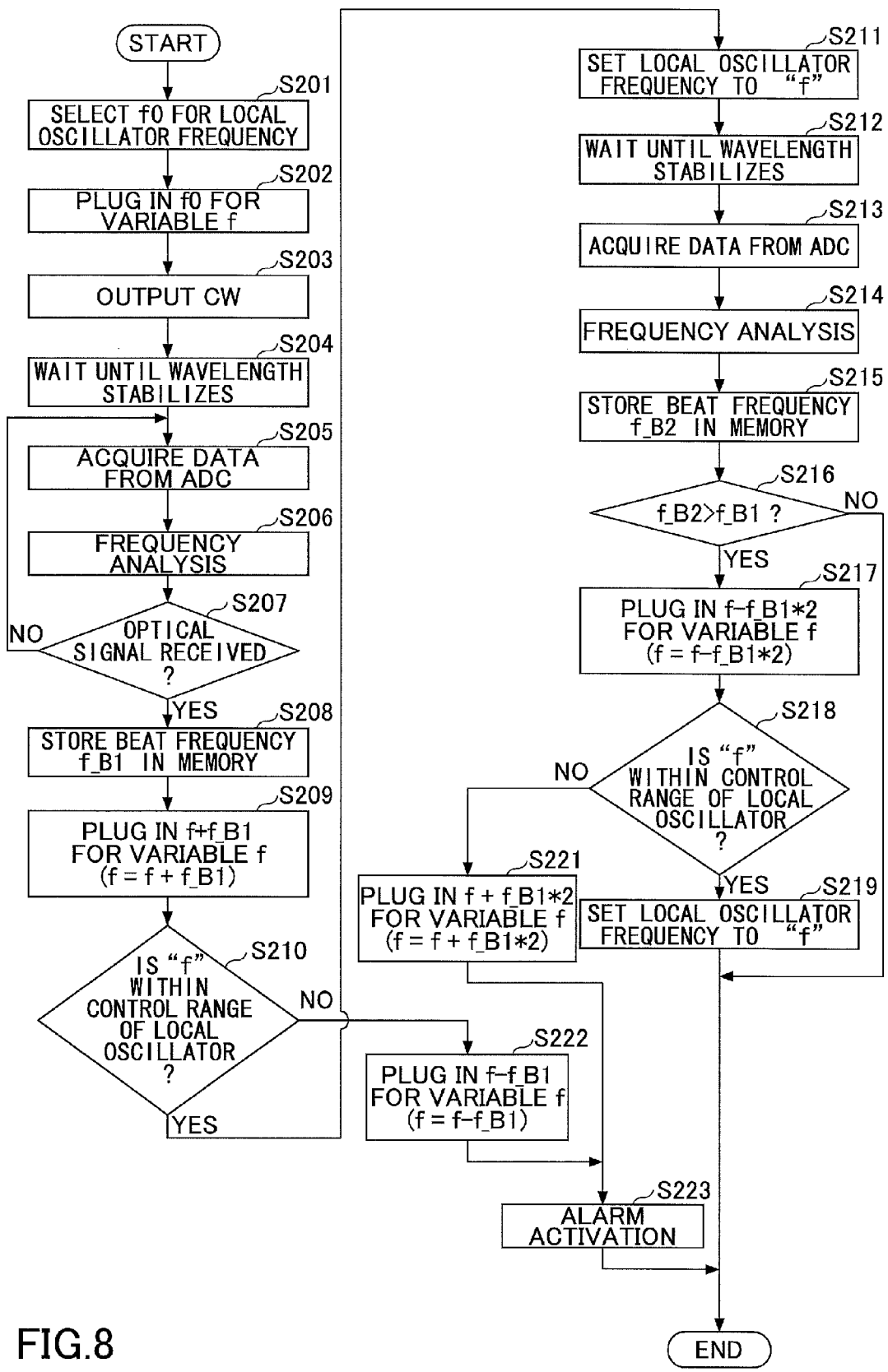
FIG. 8 is a flowchart illustrating the basic operations of the optical receiver according to the first embodiment.

FIG. 8 is a flowchart illustrating the basic operations of the optical receiver 20. First, a frequency f0 of the local oscillator source 22 is selected (S201 and S202). Continuous wave (CW) is transmitted from the local oscillator source 22 (S203) until the wavelength becomes stable (S204). Then, sampled data of the detected CW are acquired from the ADC 24 or the wavelength dispersion compensator 25 (S205), and frequency analysis is performed at the frequency analyzer 31 (S206).

It is determined through the frequency analysis whether the optical receiver 20 is receiving the light signal transmitted from the optical transmitter 10 (S207). In ordinary wavelength division multiplexing, optical amplifier are inserted in the transmission line 2 and accordingly, amplified spontaneous emission (ASE) noise is likely to be mixed in the received signal. For this reason, it is determined whether the received signal is a CW signal transmitted from the optical transmitter 10 or noise.

Figure 9A:
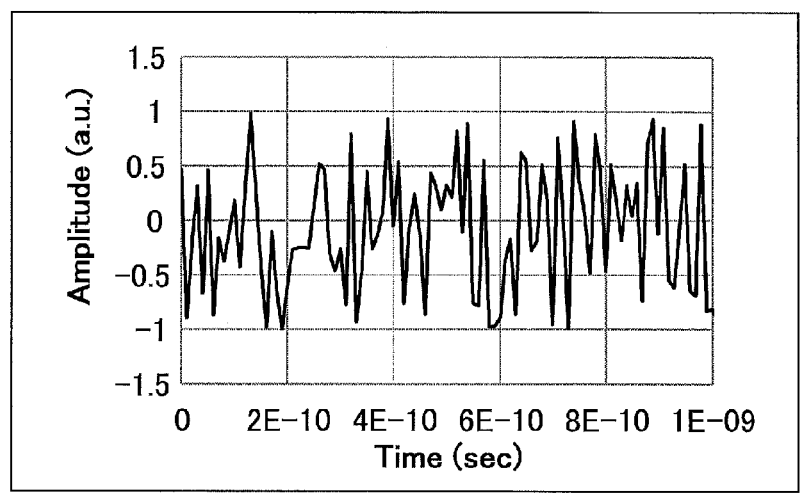
FIG. 9A is a diagram for explaining how to distinguish a transmitted signal from amplified spontaneous emission (ASE), which diagram illustrates a time waveform of a noise signal.
Figure 9B:
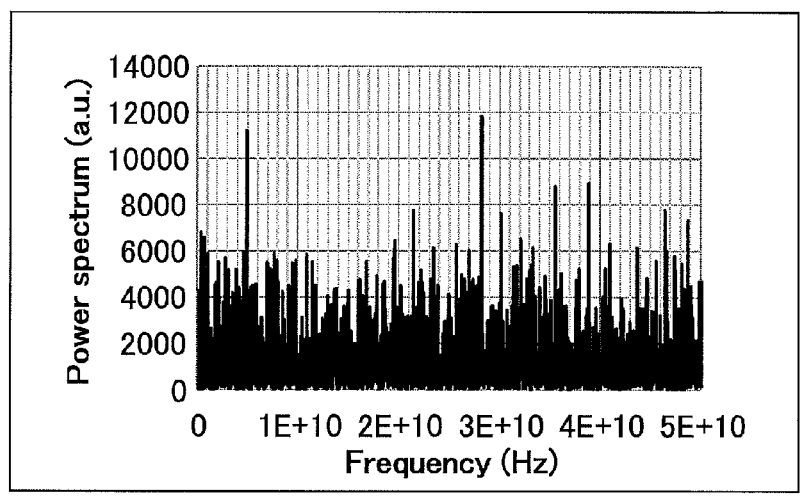
FIG. 9B is a diagram for explaining how to distinguish a transmitted signal from ASE, which diagram illustrates a power spectrum of the time waveform of FIG. 9A obtained by frequency analysis.

FIG. 9A illustrates a time waveform observed when receiving noise at 100 GHz samples per second. If frequency analysis is applied to the time waveform of FIG. 9A, variety of frequency components are detected as illustrated in FIG. 9B. Unlike the frequency spectrum of FIG. 5C or FIG. 6C, the peak level of the power spectrum is low. Accordingly, it is determined in S207 based upon the frequency analysis result which one of the transmitted light signal or ASE noise is being received. If ASE noise is being received (No in S207), the loop of S205 through S207 is repeated until the CW light signal is received from the optical transmitter 10.

To distinguish between the ASE noise and the transmission signal, a difference between the power spectrum component with the maximum power level and the power spectrum component with the second greatest power level may be calculated. If the difference is greater than a prescribed threshold, it may be determined that the transmitted light signal is being received. Alternatively, it may be determined that the transmitted light signal is being received if the power levels of the maximum through N-th components exceed a prescribed threshold value, where N is an integer equal to or greater than 2, and equal to or less than half (½) of the number of FFT points. It is unnecessary to use an absolute value to represent the magnitude of the power spectrum, and a relative value normalized by the maximum value may be used for the analysis. An amplitude spectrum may be used in place of the power spectrum.

If it is determined that the CW light signal from the optical receiver 10 is being received (Yes in S207), the beat frequency f_B1 with the maximum power spectrum level is stored based upon the frequency analysis result (S208), and f+f_B1 is plugged to the current frequency "f" of the local oscillator source 22 (S209). Because the frequency control range for the local oscillator source 22 is finite, it is determined if the new local oscillator frequency "f" which equals to f+f_B1 is within an acceptable control range for the frequency offset (S210). If the newly set local oscillator frequency exceeds the acceptable range (No in S210), the local oscillator frequency "f" is set back to the initial value (f=f−f_B1) in S222, while an alarm is generated (S223), and the operation is terminated.

If the local oscillator frequency "f" is within the acceptable control range (Yes in S210), then the local oscillator frequency "f" is set to f+f_B1 (S211), and operation is held until the wavelength stabilizes. In general, the wavelength is controlled by temperature and it takes a certain time until the wavelength stabilizes.

Then, sampled data items are again acquired from the ADC 24 (S213) for frequency analysis (S214). A beat frequency f_B2 with the maximum power spectrum level in the frequency analysis result is stored in the memory (S215). The currently acquired beat frequency f_B2 is compared with the previous beat frequency f_B1 to check the direction of adjustment for the local oscillator frequency (S216). Assuming that the frequency of the sender-side light source is f0 and that the frequency of the local oscillator source 22 is offset by −1 GHz or +1 GHz from f0, the detected beat frequency (i.e., the frequency offset) of the sampled data becomes 1 GHz in either case. The direction of change, namely whether the frequency offset of the local oscillator source 22 is controlled in the positive direction or the negative direction, cannot be detected only from the beat frequency. To solve this, f_B2 is compared with f_B1 to determine the direction of control.

If f_B2 is equal to or less than f_B1 (No in S216), the frequency offset is reduced and accordingly, the process terminates because the adjustment has been made in the right direction.

If f_B2 is greater than f_B1 (Yes in S216), it means that the beat frequency has increased after the adjustment of the local oscillator frequency. In this case, the local oscillator frequency is readjusted so as to be reduced by f_B1 from the initial frequency f0 (S217). Since, at the point of S216, the local oscillator frequency has become f=f+f_B1, twice f_B2 is subtracted from the current "f" in S217 such that f becomes f0−f_B1 (f=f−2*f_B1).

Then, it is determined whether the adjusted local oscillator frequency "f" is a tolerable offset within the acceptable control range (S218). If the adjusted value is within the control range (Yes in S218), the local oscillator frequency is fixed to "f" (S219) and the process terminates. If the adjusted value is out of the control range (No in S218), "f" is set back to the initial value (f=f+2*f_B1) in S221, while generating an alarm (S223), and the process terminates.

The operation flow of FIG. 8 illustrates only one round of local oscillator frequency adjustment for simplification purposes. It is in practice desired to repeat the control loop until the frequency offset becomes zero or the minimum.

Figure 10:
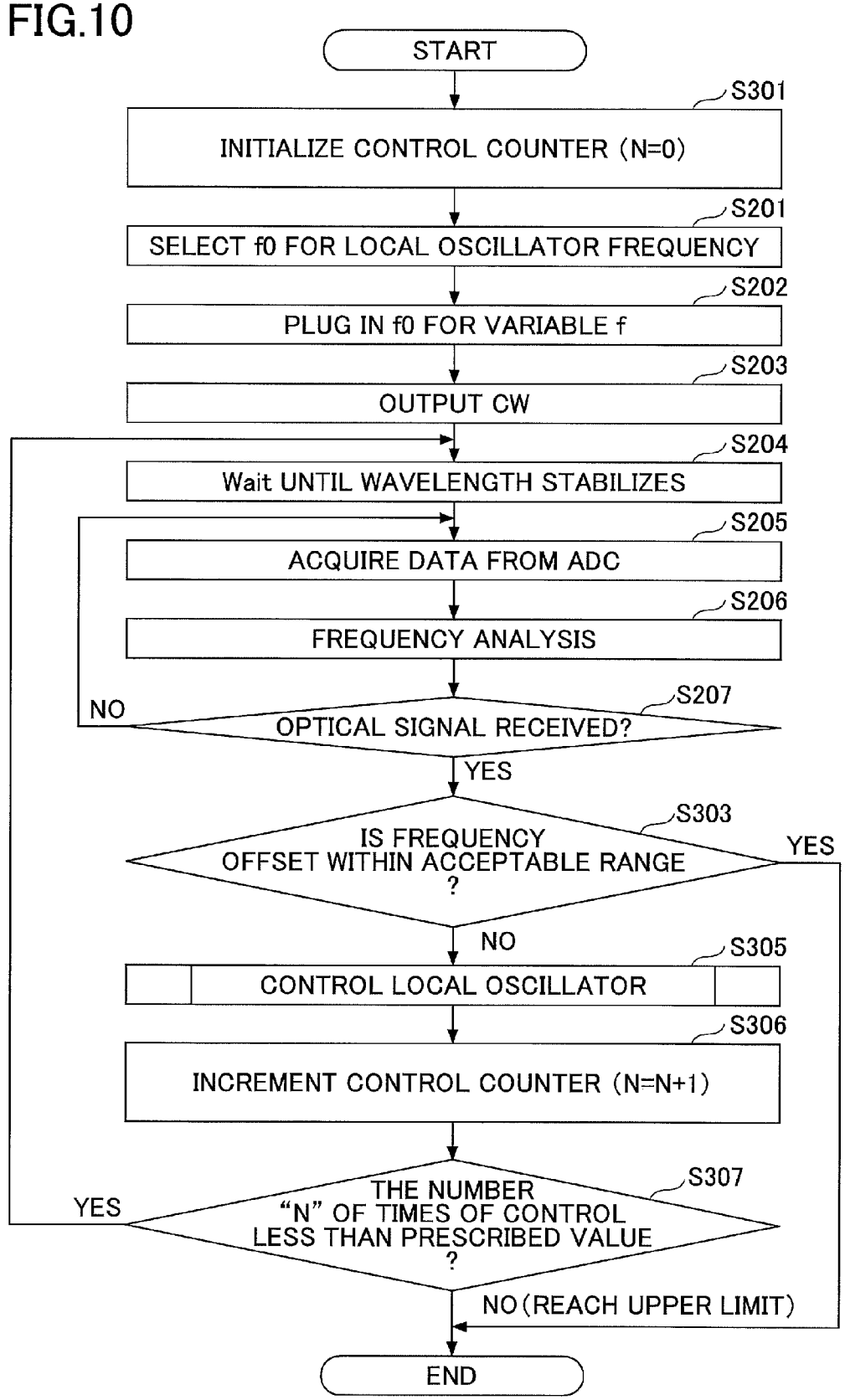
FIG. 10 is a modification of the operations flow of the optical receiver developed from the basic operations of FIG. 8.

FIG. 10 illustrates an example of the repeated control flow for the local oscillator frequency. The same steps as those illustrated in FIG. 8 are denoted by the same symbols and redundant explanation is omitted.

First, the control counter value N is initialized (N=0) in S301. Then, the local oscillator frequency f0 is selected (S201). The subsequent steps S202 through S207, namely, output of CW light from the local oscillator source 22, stabilization of the wavelength, acquirement of the sampled data from the ADC 24, frequency analysis, and determination as to whether a light signal transmitted from the counterpart optical transmitter is being received, are the same as those illustrated in FIG. 8, and redundant explanation is omitted.

If the input signal is a CW light signal from the sender side and if the frequency offset (i.e., beat frequency) acquired from the frequency analysis result is in the acceptable range (Yes in S303), the adjustment for the local oscillator frequency has been correctly made and the process terminates. If the detected frequency offset is out of the acceptable range (No in S303), adjustment of the local oscillator frequency is controlled again (S205) and the control counter value N is incremented (S306). Then determination is made as to whether N is less than a prescribed number (S307). Steps S204 through S306 are repeated until the counter value reaches the prescribed number. If the counter value has reached the prescribed number (No, S307), the process terminates.

Figure 11:
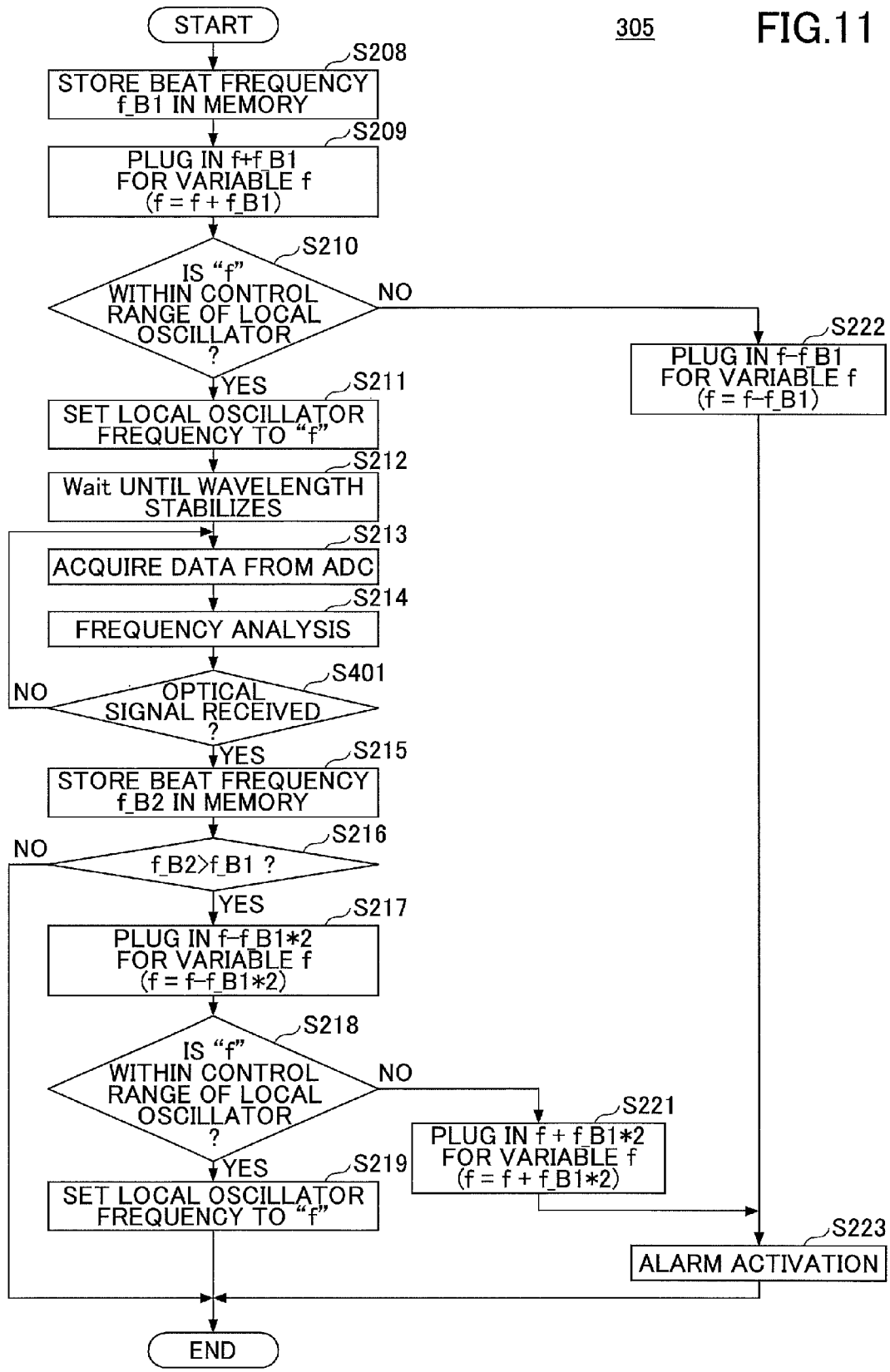
FIG. 11 is a flowchart of detailed operations of control on the local oscillator (S305) in FIG. 10.

FIG. 11 illustrates detailed operations of local oscillator control step S305 in FIG. 10. The local oscillator control is the same as the operation flow from S208 to S222 of FIG. 8. A beat frequency f_B1 with the maximum peak in the power spectrum is acquired from the frequency analysis on the first set of the sampled data from the ADC 24, and the local oscillator frequency f is set to f0+f_B1 (S208-S212). The beat frequency f_B2 with the maximum peak in the power spectrum is compared with f_B1 to confirm the direction of frequency adjustment (S213-S216). If the frequency adjustment has been made in the increasing direction, the control direction is adjusted in the correct direction (S217-S218). If the adjusted local oscillator frequency f is within the local oscillator control range, the local oscillator frequency is set to the adjusted frequency (S219). If the adjusted frequency is out of the control range, an alarm is issued and the process terminates (S221-S223).

When the control on the local oscillator is repeated as illustrated in FIG. 10, the frequency offset may be estimated from an average of the beat frequencies.

As has been described above, a continuous wave signal for LO adjustment is transmitted from the optical transmitter 10 prior to establishment of communication. At the optical receiver 20A (or 20B), sampling clocks automatically run to sample the received CW signal at a timing non-synchronous with data, thereby deleting or minimizing the frequency offset between the local oscillator source and the sender-side light source. This arrangement allows homodyne detection. Besides, burst error during data transmission or malfunction of the clock extraction circuit can be prevented, and the Q-factor penalty due to frequency offset can be reduced in intra-dyne detection.

When the plane of polarization rotates on the transmission path, the amplitude of the beat signal may become small depending on the polarization when SP-QPSK is employed. In this case, the operations flow of FIG. 8 or FIG. 10 is executed from the beginning, or alternatively, sampled data may be acquired from the ADC 24 after a predetermined wait time. In DP-QPSK, beat signals with the same frequency are acquired from four channels; however, the amplitudes of the beat signals output to the x-direction channels and to the y-direction channels may differ from each other depending on the polarization state. In this case, frequency analysis is performed at the channel with the maximum amplitude to detect a beat frequency (i.e., frequency offset). With DP-QPSK, a CW signal for beat detection generated on the sender side may be either one of the x-direction polarized signal or the y-direction polarized signal.

If a beat frequency cannot be detected at the frequency analyzer 31 even after the elapse of a certain period of time, a request may be transmitted to the optical transmitter 10 via the control plane such that a CW signal is output again.

Instead of selecting a signal source 12 at the selector 14 in FIG. 2 at the time of startup, the symbol mapper 11 may be designed to output the same data to generate a continuous wave.

In this embodiment, with the sampling rate of 100 gigasamples per second at the ADC 24, a beat signal lower than 50 GHz can be measured. In other words, the frequency of the local oscillator source 22 can be brought into agreement with an in-between frequency 25 GHz distant from the existing 50 GHz grid when establishing communications. This arrangement is advantageous for the feature variable grid or gridless architecture.

Because the local oscillator frequency conforms to the frequency of the sender-side light source, the Q-factor penalty can be reduced.

<Second Embodiment>

Figure 12:
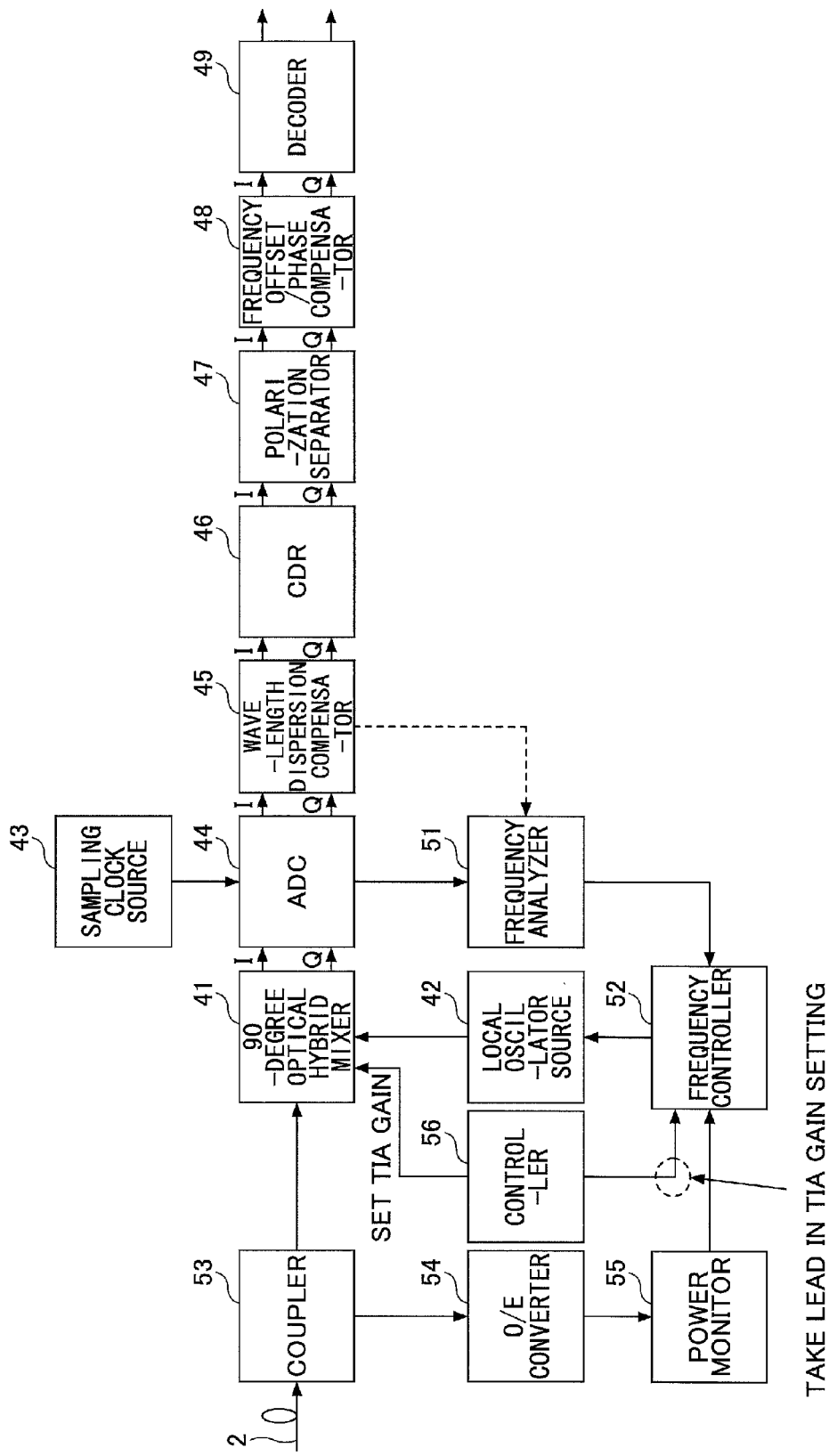
FIG. 12 is a schematic diagram of an optical receiver used in an optical communication system according to the second embodiment.

FIG. 12 is a schematic block diagram of an optical receiver 40 according to the second embodiment. The structure on the sender side is the same as that explained in the first embodiment, and optical transmitter 10A of FIG. 2A is used, for example. Although FIG. 12 illustrates a SP-QPSK optical receiver, the major operations equally apply to a DP-QPSK optical receiver and the illustration is omitted.

Modified parts include a receiving front-end connected to a coupler 53 for splitting a light signal, an optical-to-electric (OE) converter 54 for converting the light signal to an electric signal, a power monitor 55 for monitoring the light power, and a controller (second controller) 56, which components are added.

The received light signal is split by the coupler 53. One component is input to the 90-degree hybrid optical mixer 41, and the other component is input to the OE converter 54. The power monitor 55 measures the intensity of the output of the OE converter 54 to acquire a received power level, which power level is supplied to the frequency controller 52. The second controller 56 controls the gain of a transimpedance amplifier (TIA) provided in the 90-degree hybrid optical mixer 41. The gain set for the TIA is also reported to the frequency controller 52. The frequency analyzer 51 calculates a beat amplitude by the peak-to-peak or the root mean square (RMS) method from the sampled data from the ADC 44. The calculated beat amplitude is supplied together with the beat frequency (frequency offset) acquired by FFT computation to the frequency controller 52.

The power spectrum level of the beat signal sampled at the ADC 44 varies if the beat frequency differs even if the amplitude is the same. The amplitude of the beat signal is determined by the power level of the received light input to the 90-degree hybrid optical mixer 41, the light power of the local oscillator source 42, the TIA gain in the 90-degree hybrid optical mixer 41, or the like.

The frequency controller 52 selects an appropriate threshold from a threshold table 61 of FIG. 13 when determining whether a CW light signal from the optical transmitter is being received. The threshold table 61 describes a threshold value P in association with the received light power, the local oscillator power level, the TIA gain, and the post-FFT beat frequency. Other than these parameters, wiring characteristics of a printed circuit board may be considered. In place of the threshold table 61, an approximate formula defining the relationship among the parameters described in the threshold table 61 may be used.

Figure 14A:
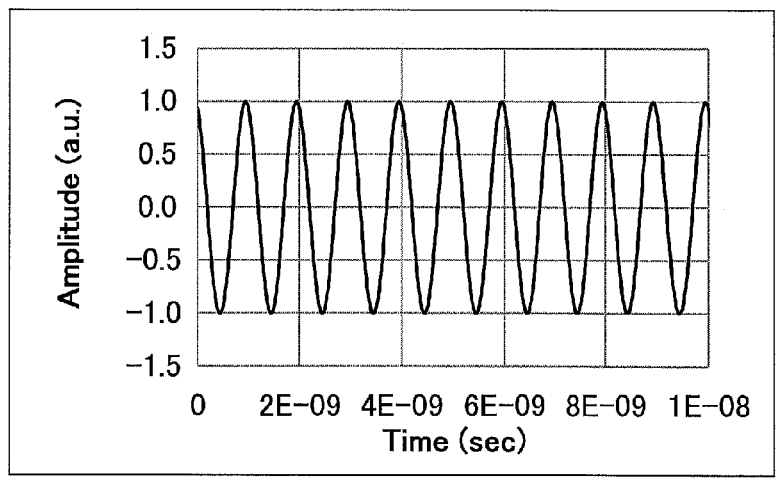
FIG. 14A illustrates a beat signal with beat frequency of 1 GHz and amplitude of 1 (arbitrary unit) sampled by the ADC.
Figure 14B:
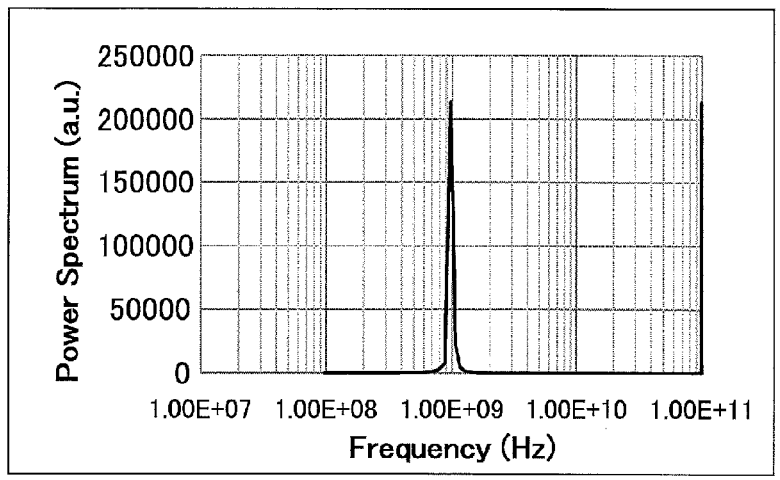
FIG. 14B illustrates a FFT computation result of the beat signal of FIG. 14A.

When the sampling rate of the ADC 44 is, for example, 100 gigasamples per second, a signal with a beat frequency of 1 GHz and an amplitude of 1 (arbitrary unit) is observed as illustrated in FIG. 14A. By performing frequency analysis on the beat signal at the frequency analyzer 51, a frequency offset of 1 GHz is detected as illustrated in FIG. 14B.

Figure 15A:
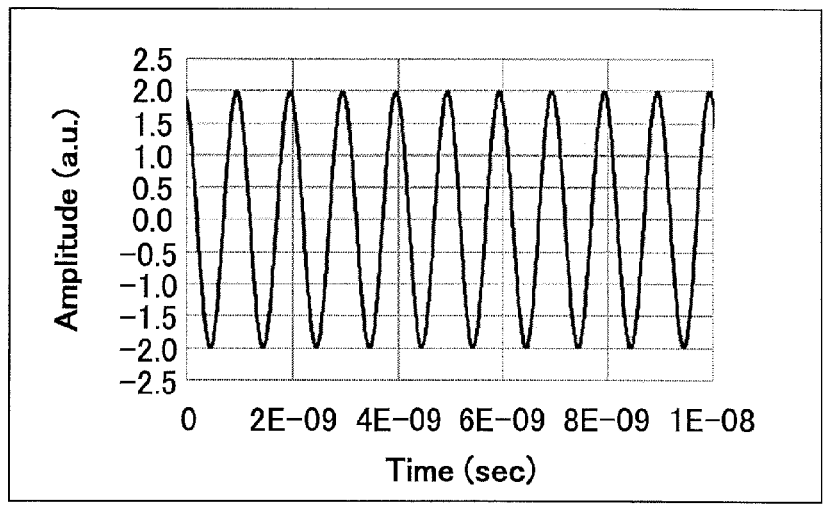
FIG. 15A illustrates a beat signal with beat frequency of 1 GHz and amplitude of 2 (arbitrary unit) sampled by the ADC.
Figure 15B:
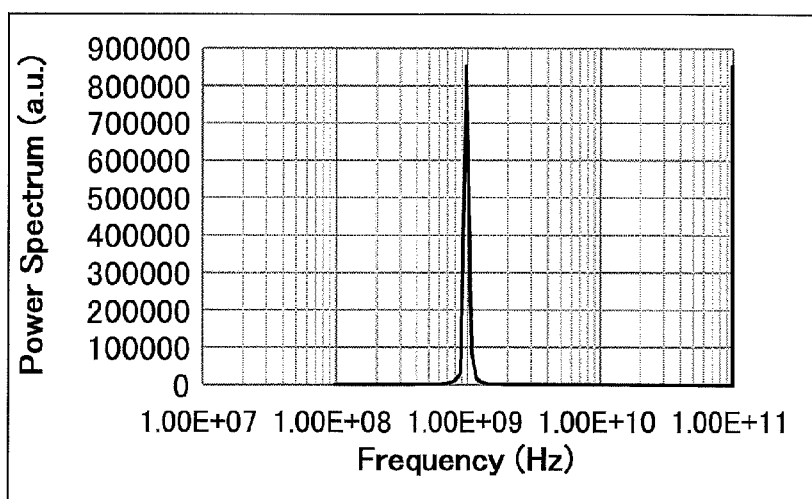
FIG. 15B illustrates a FFT computation result of the beat signal of FIG. 15A.

FIG. 15A illustrates a beat signal with a beat frequency of 1 GHz and an amplitude of 2 (arbitrary unit), and FIG. 15B illustrates a FFT computation result of the frequency analyzer 51. Comparing FIGS. 14A and 14B with FIG. 15A and FIG. 15B, it is understood that the power spectrum level (in the vertical axis) varies in response to the amplitude of the beat waveform.

Figure 16A:
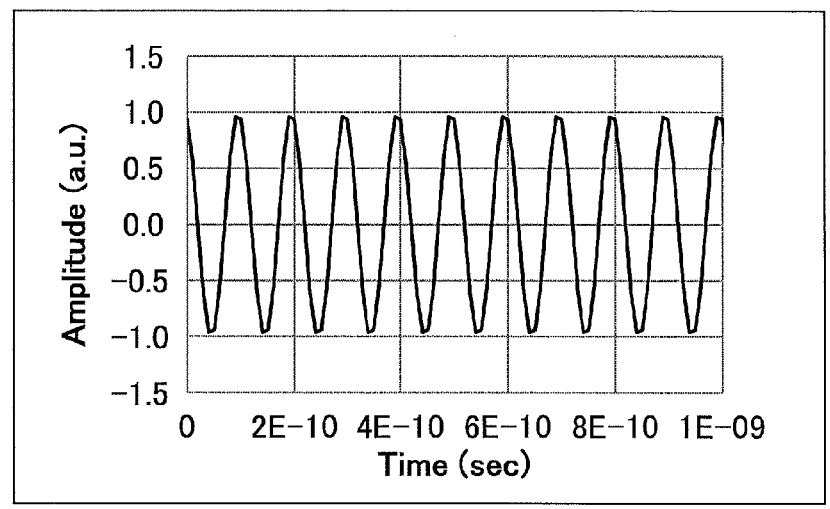
FIG. 16A illustrates a beat signal with beat frequency of 10 GHz and amplitude of 1 (arbitrary unit) sampled by the ADC.
Figure 16B:
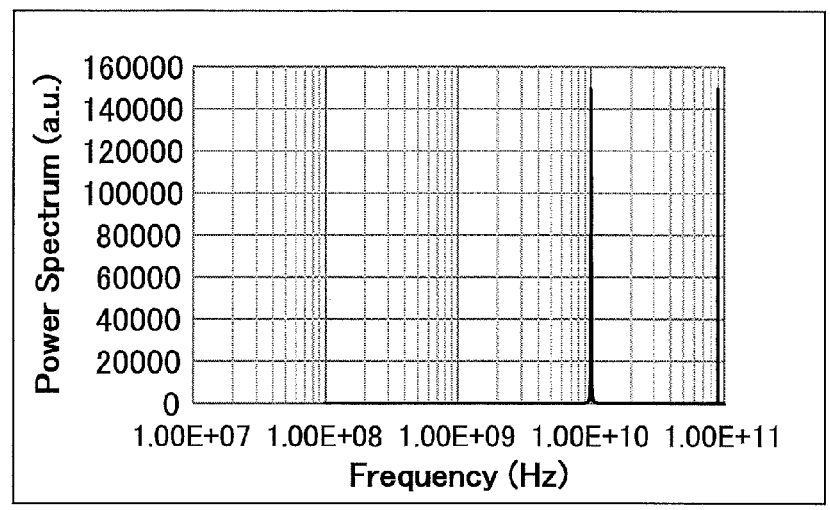
FIG. 16B illustrates a FFT computation result of the beat signal of FIG. 16A.

FIG. 16A illustrates a beat signal with a beat frequency of 10 GHz and an amplitude of 1 (arbitrary unit), and FIG. 16B illustrates a FFT computation result of the frequency analyzer 51. Comparing FIGS. 14A and 14B with FIG. 16A and FIG. 16B, it is understood that the power spectrum level (in the vertical axis) varies in response to the beat frequency even at the same amplitude.

For this reason, the threshold table 61 of FIG. 13 describes different threshold values P in accordance with the beat amplitude, the beat frequency, etc., and an appropriate threshold value P is used to determine whether a CW light signal is being received. At the same received light power (e.g., P_S1), the local oscillator power level may varies (e.g., P_L1 and P_L2) with different TIA gains (e.g., G1, G2, G3, etc.), and the beat frequency (frequency offset) detected by frequency analysis is different.

In FIG. 13, the threshold table 61 has a single threshold P of the maximum component of the power spectrum in each line. In place of the table 61, a threshold table 62 illustrated in FIG. 17 may be used, in which table multiple thresholds P1-PN are set for the 1st through the N-th greatest components of the power spectrum.

FIG. 18A and FIG. 18B illustrate still other threshold tables 63A and 63B, respectively. In FIG. 18A, a threshold value P is associated with the beat frequency and the beat amplitude. The beat frequency is the FFT computation result of the ADC sampling data acquired at the frequency analyzer 51. The beat amplitude is calculated by the peak-to-peak or the RMS method from the sampled data from the ADC 44. BY associating the threshold value P with the beat frequency and the beat amplitude, an appropriate threshold value P can be selected when determining existence of a CW light signal from the sender side.

As illustrated in FIG. 18B, multiple threshold values (P1-PN) for the 1st through N-th greatest components of the power spectrum may be entered in the table 63B, or alternatively, an approximate formula defining the relationship among the threshold value P, the beat frequency, and the beat amplitude may be used instead of the table. As in the first embodiment, if a beat frequency cannot be detected at the frequency analyzer 51 even after the elapse of a certain period of time, a request for retransmitting the CW light signal may be supplied to the optical receiver 10 via the control plane.

Structures and operations of a sampling clock source 43, a wavelength dispersion compensator 45, a CDR 46, a polarization separator 47, a frequency offset and phase compensator 48, and a decoder 49 are the same as those in the first embodiment, and explanation for them is omitted.

<Third Embodiment>

Figure 19:
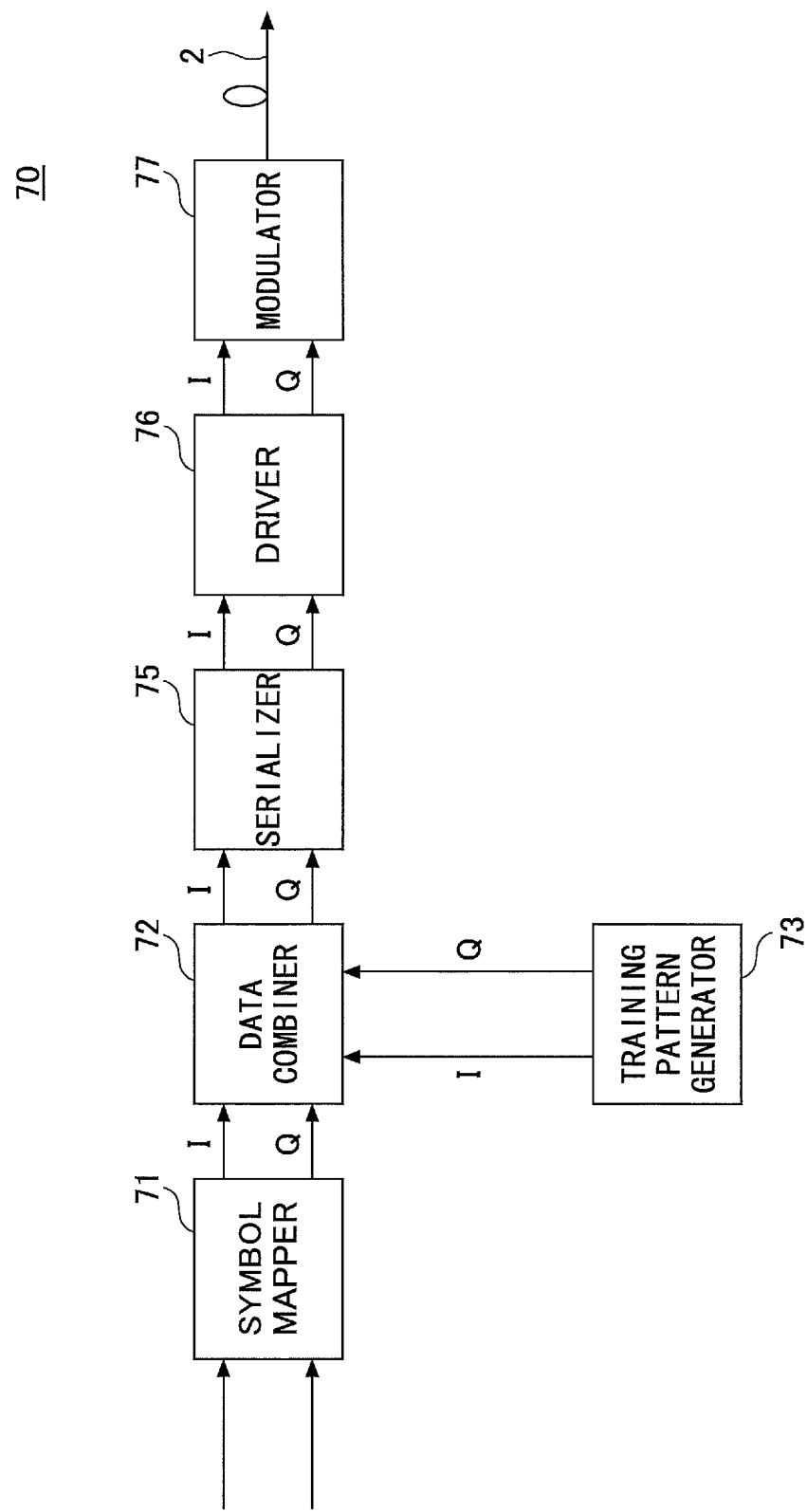
FIG. 19 is a schematic diagram of an optical transmitter used in an optical communication system according to the third embodiment.

FIG. 19 is a schematic block diagram of an optical transmitter 70 used in an optical communication system according to the third embodiment. In the third embodiment, a training pattern for frequency offset is inserted on the sender side.

The optical transmitter 70 has a symbol mapper 71, a training pattern generator 73, and a data combiner 72. The training pattern generated by the training pattern generator 73 is combined with an output of the symbol mapper 71 at the data combiner 72. A serializer 75, a driver 76 and a modulator 77 provided after the data combiner 72 have the same structure and perform the same operations as those illustrated in the first embodiment.

The training pattern generator 73 generates a pattern that enables the modulator 77 to output a continuous wave for a predetermined period of time and enables the receiver to detect a beat waveform. With QPSK, the same data with the same sign are continuously output.

Figure 20:
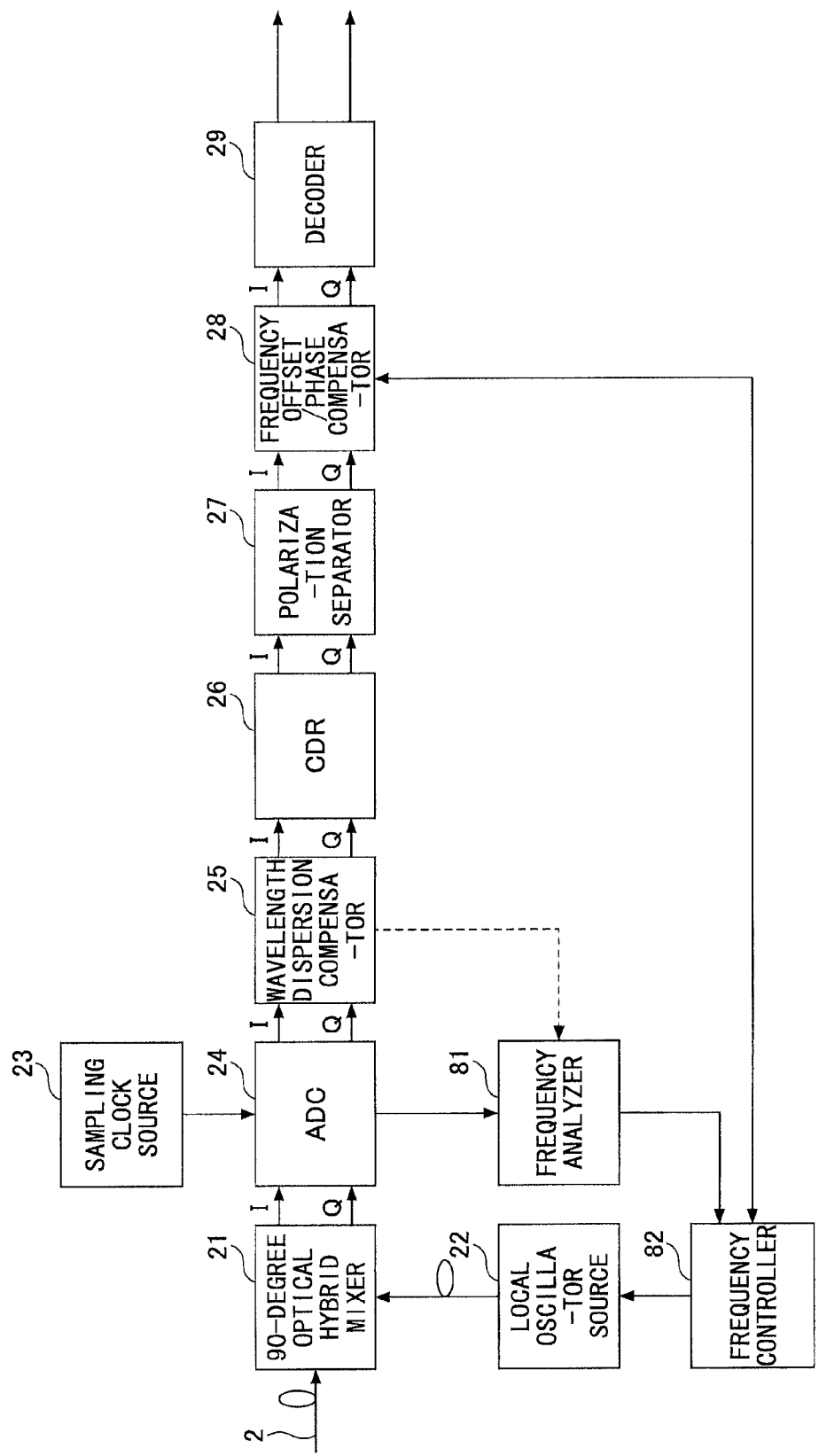
FIG. 20 is a schematic diagram of an optical receiver used in the optical communication system of the third embodiment.

FIG. 20 is a schematic block diagram of an optical receiver 80 used in the optical communication system according to the third embodiment. The same elements as those in the first embodiment are denoted by the same symbols and redundant explanation is omitted. The frequency analyzer 81 acquires digitally sampled data with a predetermined symbol length from the ADC 24, and groups the sampled data into multiple blocks of a constant length by shifting the respective blocks symbol by symbol. By grouping the sampled data into multiple blocks, while shifting the blocks symbol by symbol, it is guaranteed that the entirety of the training pattern is contained in one of the blocks without fail. The frequency analyzer 81 performs FFT computation on each of the blocks and selects a block containing the full training pattern from the FFT power spectrum to detect a frequency offset. The frequency controller 82 controls the frequency of the local oscillator source 22 based upon the detected frequency offset.

The frequency controller 82 reads a frequency offset compensation value out of the frequency offset and phase compensator 28 and determines whether the frequency of the local oscillator source 22 is less or greater than the frequency of the sender-side light source. Simultaneously with control on the local oscillator source 22, the frequency controller 82 controls the frequency offset and phase compensator 28 so as to avoid overcompensation.

Figure 21:
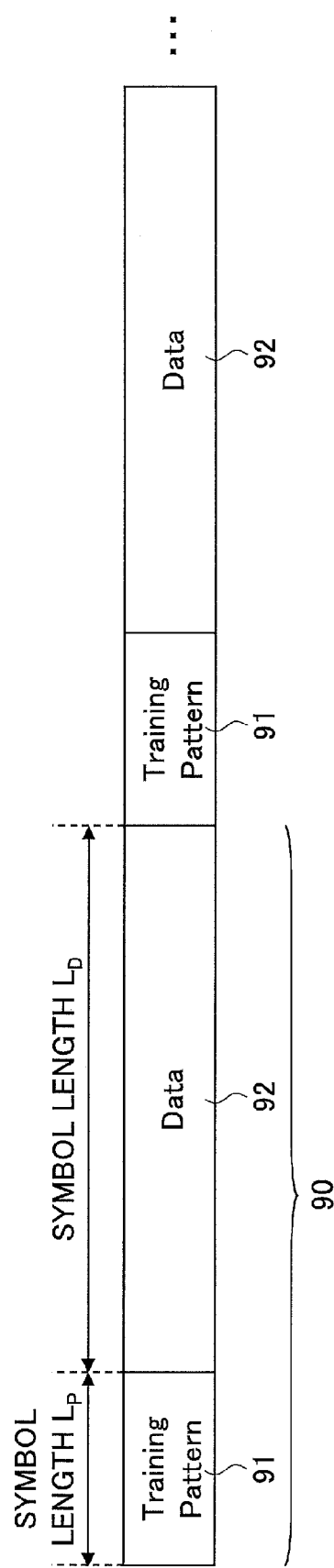
FIG. 21 illustrates a frame structure of a transmission signal from the optical transmitter of FIG. 19.

FIG. 21 illustrates an example of a frame structure of the optical transmitter 70 of FIG. 19. The transmission frame 90 includes a training pattern 91 with a symbol length $L_P$ and a data block 92 with a symbol length $L_D$. The training pattern 92 is inserted in the data to be transmitted at regular or irregular intervals. The training pattern 91 is a pattern that enables the optical transmitter 70 to output a continuous wave (CW), which is equivalent in QPSK to transmission of the same symbols. The training pattern 91 is an arbitrary signal that enables the receiver to detect a sine wave beat signal, and a low-modulation signal used in the first embodiment (see FIG. 6A) may be used.

If the symbol rate is 50 G-symbol/s (1 symbol period is 20 ps), and if the length of the training pattern 91 is 100 symbols, the receiver can monitor a sine wave of maximum period of 2 ns (20 ps multiplied by 100 symbols). Since 2 ns corresponds to 500 MHz, a frequency offset at or above 500 MH can be detected.

FIG. 22A and FIG. 22B illustrate sizes of the digitally sampled data from the ADC 24, acquired by the frequency analyzer 81 of the optical receiver 80. If digitally sampled data with the length of $(L_P+P_D)$, which is the total of the symbol length $L_P$ of the training pattern 91 and the symbol length $L_D$ of the data block 92, are acquired from the ADC 24 in FIG. 22A, the entirety of the training pattern 91 may not be monitored depending on the acquiring timing.

To avoid such a situation, digitally sampled data with a length of $2*L_P+L_D$ are acquired from the ADC 24 as illustrated in FIG. 22B to monitor the entirety of the training pattern 91. If the ADC 24 carries out M-times oversampling (where M is an integer equal to or greater than 1), $(2*L_P+L_D)*M$ sampled data are acquired from the ADC 24. Because the FFT frequency resolution is determined by the number of data points and the sampling frequency, data from the ADC 24 may be thinned out according to the required resolution.

Figure 23:
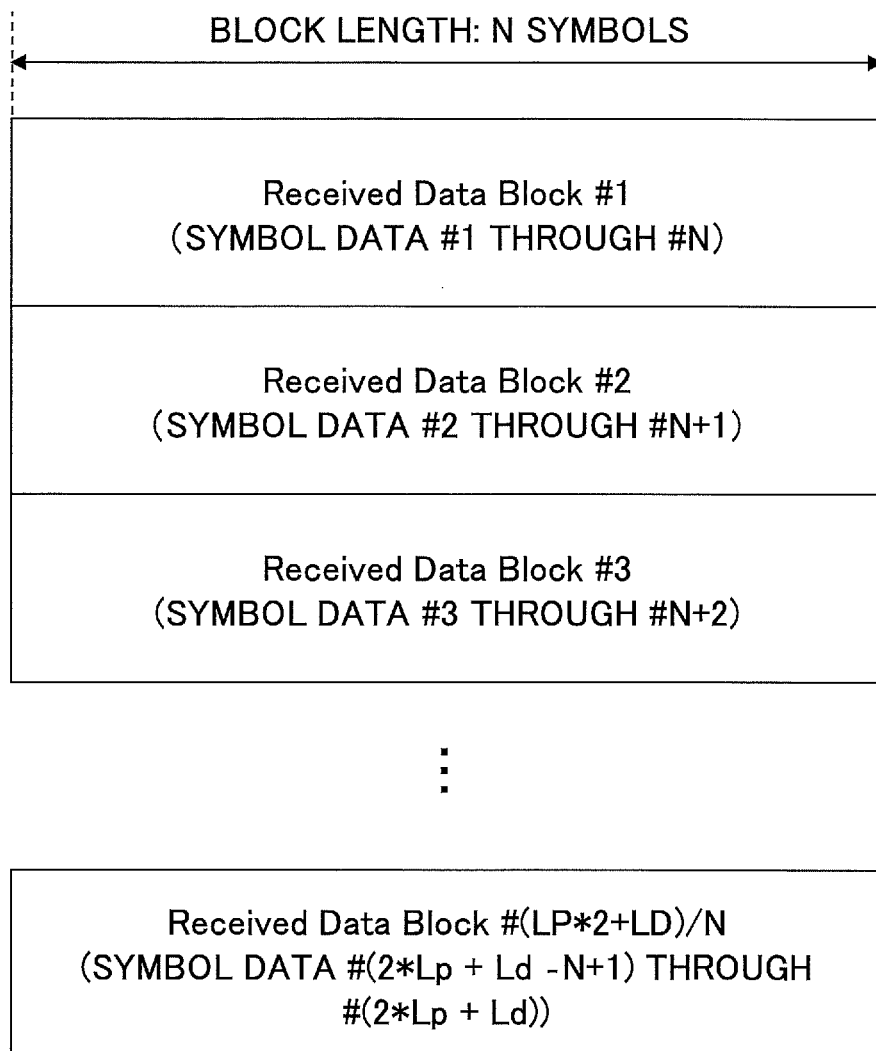
FIG. 23 illustrates an example of grouping of the sample data from the ADC into multiple blocks.

FIG. 23 illustrates grouping of the digitally sampled data acquired from the ADC 24. The frequency analyzer 81 groups the digitally sampled data from the ADC 24 into multiple blocks, each block with a length of N symbols (N is an integer equal to or less than $L_P$) and shifted by 1 symbol. With this arrangement, the entirety of the training pattern is contained in any one of the blocks without fail.

Figure 24:
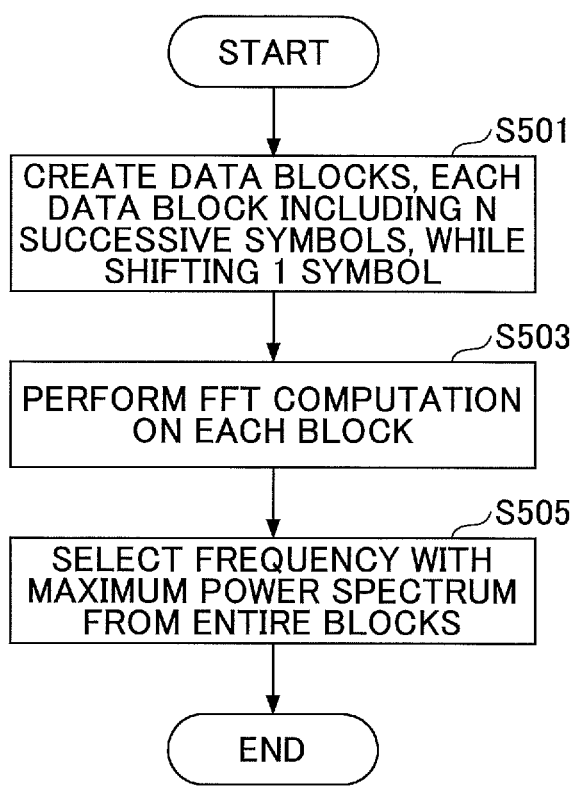
FIG. 24 is a flowchart of operations performed by the optical receiver.

FIG. 24 is a flowchart of operations performed by the frequency analyzer 81 of the optical receiver 80. The creation of blocks illustrated in FIG. 23 by grouping the sampled data while shifting symbol by symbol is performed based upon the sampled data output from the ADC 24 or the wavelength dispersion compensator 25 (S501). Then, FFT computation is applied to each of the blocks (S503). Then, a beat frequency of the maximum power spectrum is selected from among the blocks.

If data components other than the training pattern are contained in the block, FFT is performed on signals other than the sine wave, and a beat frequency power spectrum illustrated in the first and second embodiments cannot be detected.

Figure 25A:
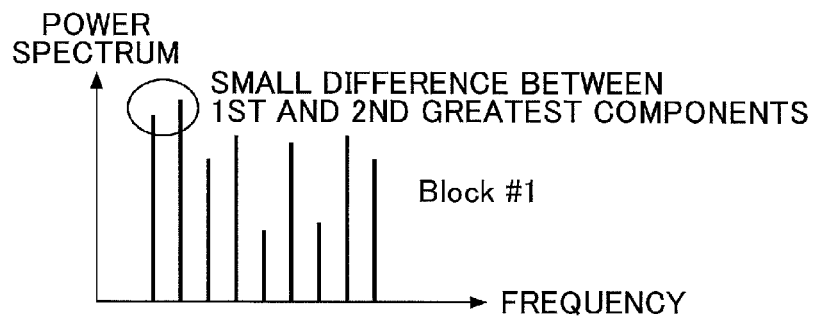
FIG. 25A is an example of power spectrum obtained in accordance with components contained in each block of the sampled data from the ADC.
Figure 25B:
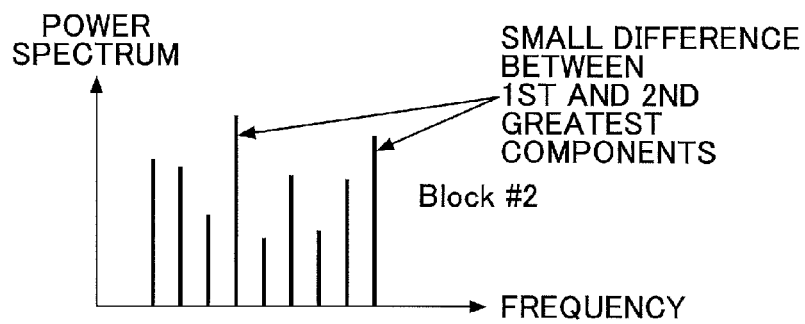
FIG. 25B is an example of power spectrum obtained in accordance with components contained in each block of the sampled data from the ADC.
Figure 25C:
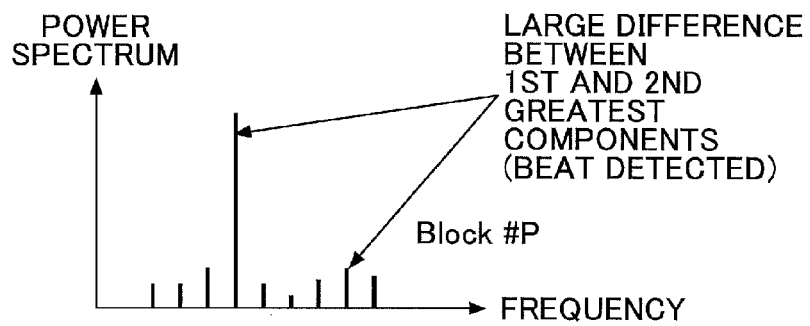
FIG. 25C is an example of power spectrum obtained in accordance with components contained in each block of the sampled data from the ADC.

FIG. 25A through FIG. 25C illustrate selection of a block with the optimum power spectrum. In block #1 of FIG. 25A and block #2 of FIG. 25B, the difference between the first and the second greatest component is small, and a variety of frequency components are contained. These spectra indicate that data other than the training pattern are contained in the block.

In contrast, in block #P of FIG. 25C, where P is an integer representing the block number between the first block and the last block, the difference between the first and the second greatest components is large. In this case, the entirety or the significant part of the training pattern is contained in block #P and a beat frequency is detected clearly.

The determination whether the training pattern is contained may be performed using a threshold value as in the first and the second embodiments. To reduce the control time, frequency analysis and comparison with the threshold value may be carried out on the block by block basis, and the analysis may be terminated upon detection of a beat frequency. In this case, the local oscillator frequency is controlled without analyzing the rest of the blocks. If a training pattern is inserted at irregular intervals on the sender side, storing of the beat frequency (S208) and control on the local oscillator (S209-S219) of FIG. 8 are performed only when a beat is detected based upon the threshold value.

In the third embodiment, a minute fluctuation in the local oscillator frequency that does not influence the frequency offset compensation can be corrected only at the time of startup prior to establishment of data communication, but also during the operation (i.e., during data transmission after establishment of the line synchronization).

As had been described, the frequency controller 82 reads the current value of frequency offset compensation out of the frequency offset and phase compensator 28 during the operation to determine whether the local oscillator frequency is less or greater than the frequency of the sender-side light source. The frequency controller 82 varies the frequency of the local oscillator source 22 so as to compensate for the frequency offset detected by the frequency analyzer 81 from the training pattern. Simultaneously, the frequency controller 82 controls the frequency offset compensation value of the frequency offset and phase compensator 28 so as to avoid overcompensation.

FIG. 26 illustrates adjustment of the quantity of frequency offset compensation in response to a change in the local oscillator frequency. When the frequency of the local oscillator source 22 is controlled by temperature, the local oscillator frequency may not immediately shift to the target frequency, and signal communications may be affected. To solve this issue, the quantity of frequency offset compensation at the frequency offset and phase compensator 28 may be adjusted as indicated by the dashed line in accordance with the change in the local oscillator frequency indicated by the solid line. The time data about the frequency change in the local oscillator source 22 may be acquired in advance.

If polarization division multiplexing is employed, the training pattern may be inserted in one or both of the x-polarized wave and the y-polarized wave for the detection on the receiver side.

<Fourth Embodiment>

Figure 27:
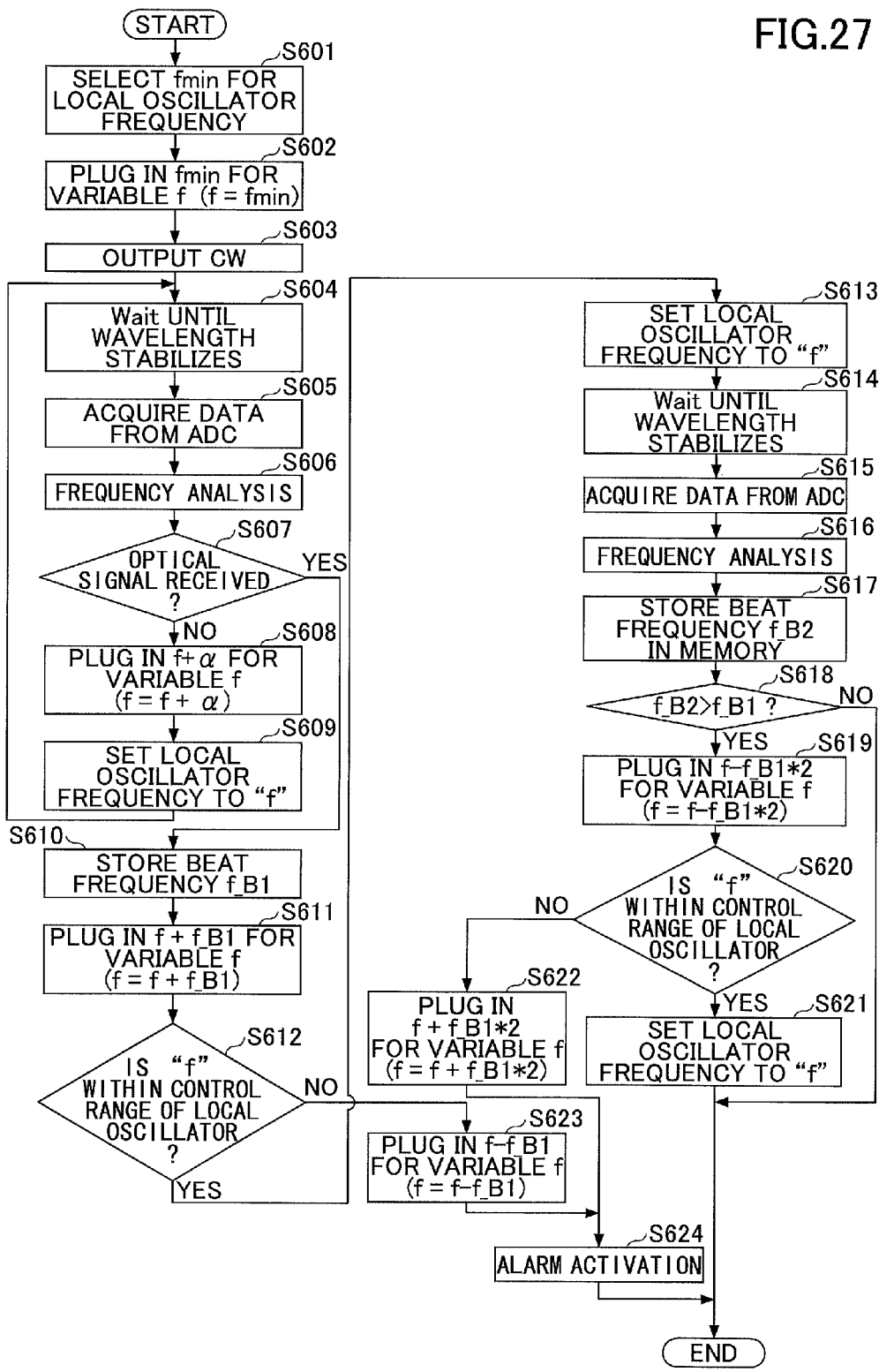
FIG. 27 is a flowchart of operations performed by an optical receiver according to the fourth embodiment.

FIG. 27 is a flowchart illustrating the basic operations of an optical receiver according to the fourth embodiment. The optical transmitter used in the fourth embodiment is the optical transmitter 10A or 10B of the first embodiment that outputs a continuous wave, or the optical transmitter 70 of the third embodiment that inserts a training pattern in the data to be transmitted.

In the fourth embodiment, instead of externally setting the local oscillator frequency, the local oscillator frequency sweeps from the minimum to the maximum frequency of the local oscillator source 22 at a frequency step size of a (GHz) to automatically bring the local oscillator frequency into agreement with or close to the frequency of the sender-side light source.

The frequency step size a is a parameter determined by the band of the TIA (not illustrated) in the 90-degree hybrid optical mixer of the optical receiver and the band of the ADC. If the frequency offset is great, that is, if the beta signal is a high-frequency signal, then the beat signal cannot be detected. To be more precise, if the total band of the TIA and the ADC is fc and if the beat frequency is fb, the ADC cannot monitor the beat signal when the beat frequency fb is much greater than the total band fc (fb>>fc).

In FIG. 27, the minimum frequency $f_{min}$ is selected (S601), and local oscillator frequency "f" is set to $f_{min}$ (S602). The local oscillator source outputs a continuous wave (S603) and waits until the wavelength stabilizes (S604). Sampled data are acquired from the ADC and frequency analysis is performed (S606). It is determined from the frequency analysis result whether a light signal is being received from the sender side (S607). This determination can be made using threshold values as explained in the first embodiment.

If a beat signal is not detected (No in S607), the local oscillator frequency is increased by α GHz (S608), and set to the next value (S609). Steps S604-S609 are repeated until a beat signal is detected.

When the beat signal is detected (Yes in S607), the beat frequency f_B1 is stored as the frequency offset (S610), and the local oscillator frequency "f" is set to f+f_B1 (S611). Then it is determined if the newly set frequency is within the control range of the local oscillator frequency (S612). In accordance with the determination result, necessary operations are carried out.

The subsequent steps S613-S624 include acquirement of the sampled data from the ADC and confirmation of the changing direction based on the comparison between f_B1 and f_B2 (S613-S621), as well as termination of the process when the detected frequency offset is out of the acceptable range (S622-S624). These steps are the same as S211-S223 of FIG. 8, and redundant explanation is omitted.

In the flow of FIG. 27, minute adjustment is made only once when a beat frequency is detected by sweeping the frequency at a step size a.

Figure 28:
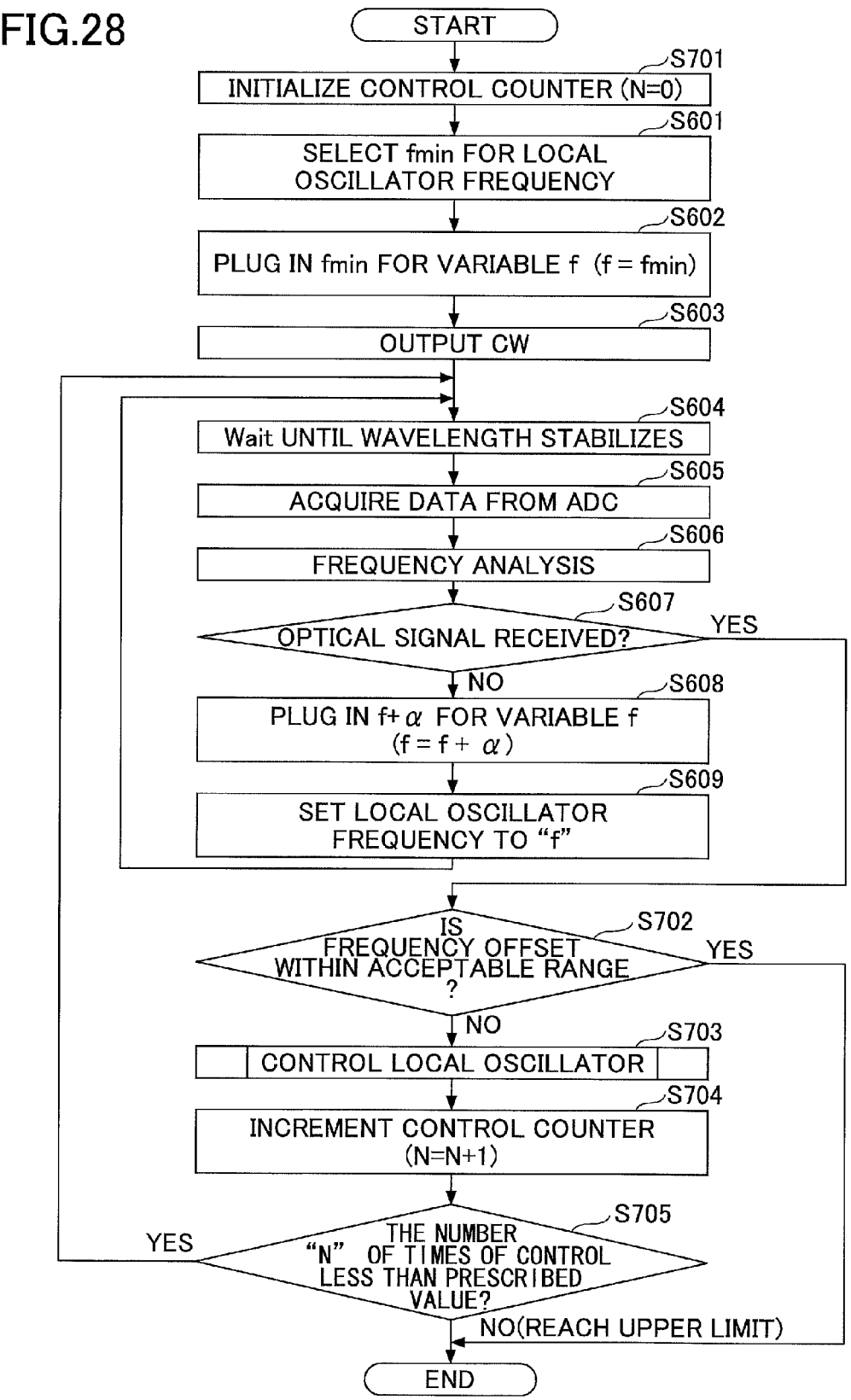
FIG. 28 is a modification of the operation flow of FIG. 27.

FIG. 28 illustrates a modification of FIG. 27, in which minute adjustment is performed several times. The same steps as those in FIG. 27 are denoted by the same symbols and redundant explanation is omitted.

First, the control count value N is initialized (N=0) (S701). Then, the minimum frequency $f_{min}$ is selected (S601), and local oscillator frequency "f" is set to $f_{min}$ (S602). The subsequent steps S603-S609, namely, output of a continuous wave from the local oscillator source, stabilization of the wavelength, acquirement of the sampled data from the ADC, frequency analysis, and frequency sweep at a step size a until the detection of the beat signal are the same as those in FIG. 27, and redundant explanation is omitted.

When a beat signal is detected (Yes in S607), it is determined if the frequency offset is within the acceptable range (S702). If the frequency offset is within the acceptable range (Yes in F702), the process terminates because the adjustment for the local oscillator frequency is appropriately made. If the frequency offset is out of the acceptable range (No in F702), the adjustment of the local oscillator frequency is controlled in the correct direction (S703), and the control count value N is incremented (S704). Then, it is determined if N has reached a predetermined number (S705), and S604-S704 are repeated the predetermined number of times. The process terminates when N has reached the predetermined number (No in F705).

Figure 29:
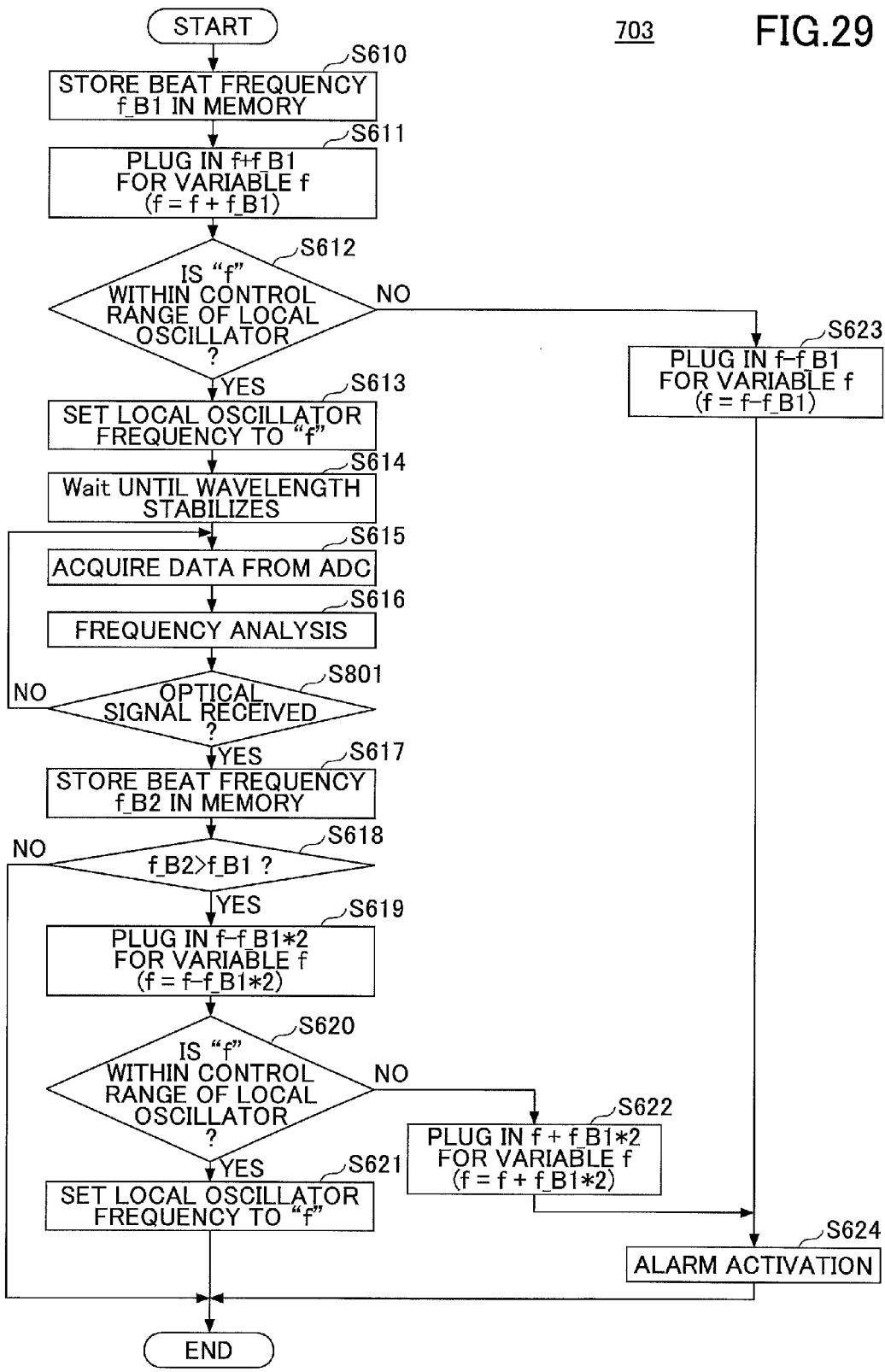
FIG. 29 is a flowchart of detailed operations of control on the local oscillator (S703) in FIG. 27.

FIG. 29 illustrates detailed operations of S703 of FIG. 28. The controls on the adjustment of the local oscillator frequency are the same as S610-S623 of FIG. 27. The first beat frequency f_B1 with the maximum peak level is acquired from the first frequency analysis result of the ADC sampled data and the local oscillator frequency "f" is set to f+f_B1 within the acceptable offset range (S610-S614). Then the second beat frequency f_B2 is compared with f_B1 to check the direction of frequency adjustment (S615-S618). If the adjustment is being made in the direction in which the offset frequency increases, the operation is controlled in the correct direction (S619-S620). If the adjusted local oscillator frequency is within the acceptable range, the adjusted frequency is fixed (S621). If the adjusted local oscillator frequency is out of the acceptable range, the process terminates, while generating an alarm (S622-S624).

By sweeping the local oscillator frequency at a step size α until a beat signal is detected, the local oscillator frequency can be refined in the acceptable offset range.

Similarly to the first and the second embodiments, if no beat signal is detected by the frequency analyzer even after the elapse of a prescribed period of time, a request for outputting a continuous wave signal is made to the sender side via the control plane.

Figure 30:
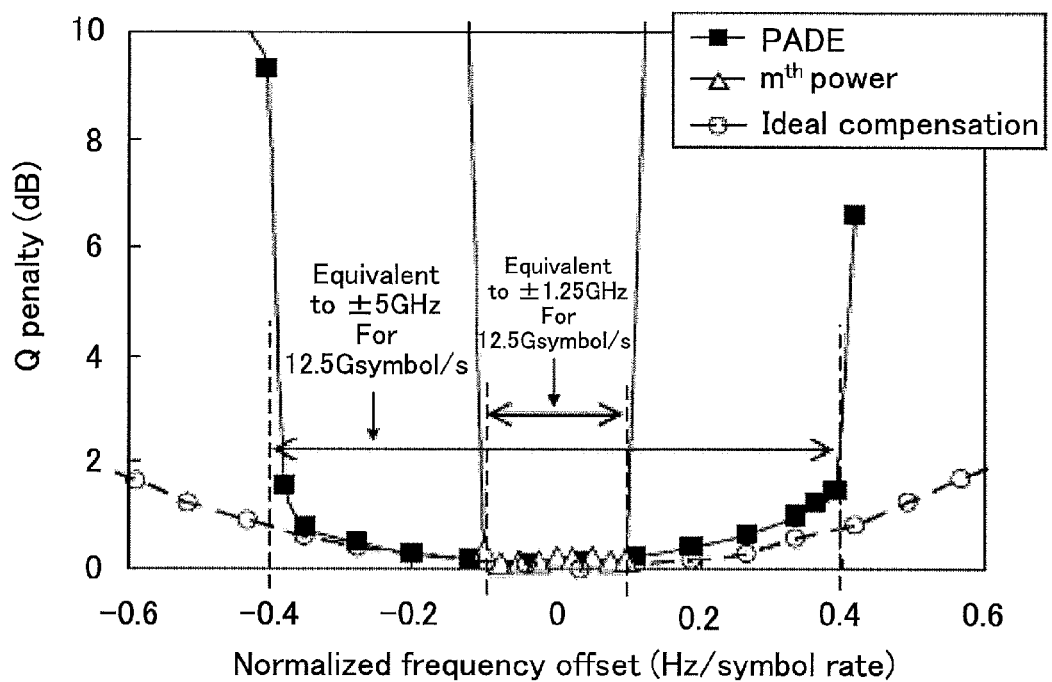
FIG. 30 illustrates an advantageous effect of the embodiments.

FIG. 30 is a graph used to explain the advantageous effects of the embodiments. The graph of FIG. 30 represents the relationship between the normalized frequency offset and the Q-factor penalty. The m-th power algorithm represented by triangle marks in the graph, which algorithm is an ordinary method of frequency offset estimation, can compensate for the normalized frequency offset within the range of ±0.1. The PADE method (proposed by Nakashima et al.) represented by dark square marks in the graph can expand the frequency offset compensation range to ±0.4; however the Q-factor penalty increases near the edges of the compensation range. Even with the ideal compensation represented by circle marks in the graph, the Q-factor penalty increases as the absolute value of the frequency offset increases.

In contrast, with the method of the embodiments, frequency analysis is performed on sampled data acquired from a functional block (such as ADC or wavelength dispersion compensator) that is independent of the modulation scheme to bring the local oscillator frequency into agreement or close to the frequency of the sender-side light source. Accordingly, the normalized frequency offset can be minimized at or in the vicinity of zero regardless of the modulation scheme. Little Q-factor penalty occurs with any types of modulation schemes.

In addition, the range of frequency offset estimation based upon beat signals is wider, compared with frequency offset compensation executed by the digital signal processor. For example, if twice oversampling is performed on 50 G symbols/s data, the sampling rate is 100 G samples/s. With FFT computation, a beat signal component can be detected up to the Nyquist frequency (i.e., half the sampling frequency), and accordingly, frequency offset less than 50 GHz can be compensated for.

In the Optical Internetworking Forum (OIF), the frequency offset of a light source at initial startup is standardized to the range ±2.5 GHz. Even if taking into account the maximum 5 GHz (50 G symbols/s) offset due to age-related degradation, the normalized frequency offset is 0.1 and little Q-factor penalty occurs regardless of the compensation method such as the m-th power algorithm or the PADE method.

Because a beat signal less than 50 GHz can be measured, optical communication can be established with the local oscillator frequency that has been brought into agreement with an in-between frequency 25 GHz distant from the existing 50 GHz grid. Even if the currently employed grid interval is changed in the future, employing flexible grid or gridless techniques, the frequency offset can be controlled by the technique of the present embodiments to establish communications.

In the optical receivers of the first through the fourth embodiments, the interface for acquiring data from the ADC, the frequency analyzer, and the frequency controller can be realized by a large-scale integrated circuit (LSIC) such as a field-programmable gate array (FPGA) or an application-specific integrated circuit (ASIC) with a high-speed interface that can operate at the same speed as the ADC. If a low-speed circuit is used, interfaces from the ADC may be arranged in parallel to acquired sampled data at a low speed for the frequency analysis and the frequency control. A memory may be inserted between adjacent blocks of the ADC, the frequency analyzer, and the frequency controller to absorb a difference in the processing speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:

1. An optical receiver used in an optical communication system, comprising:
    a wave detector configured to detect a received light signal using a local oscillator light to acquire an electric signal;
    an analog to digital converter configured to perform digital sampling on the electric signal to output digitally sampled data; and
    a frequency analyzer configured to perform frequency analysis on the digitally sampled data prior to demodulation to detect a beat frequency observed at the analog to digital converter,
    wherein a frequency of the local oscillator light is controlled based upon the detected beat frequency.

2. The optical receiver according to claim 1, wherein the analog to digital converter performs the digital sampling at a clock non-synchronous with a data clock.

3. The optical receiver according to claim 1,
    wherein the received light signal includes a data signal with a symbol length of $L_D$ and a training pattern with a symbol length of $L_P$,
    wherein the frequency analyzer is configured to take in the digitally sampled data with a length of $(L_D+2*L_P)$, group the digitally sampled data into multiple blocks with a constant length by shifting the blocks symbol by symbol, and perform the frequency analysis on each of the blocks to select a block in which the beat frequency is detected, and
    wherein the frequency of the local oscillator light is controlled based upon the beat frequency detected in the selected block.

4. The optical receiver according to claim 1, further comprising:
    a compensator configured to compensate for a frequency offset by performing digital signal processing on the digitally sampled data; and
    a controller configured to control the frequency of the local oscillator light based upon the beat frequency detected by the frequency analyzer and a quantity of compensation acquired from the compensator.

5. The optical receiver according to claim 1, further comprising:
    a compensator configured to compensate for a frequency offset by performing digital signal processing on the digitally sampled data;
    a controller configured to control the frequency of the local oscillator light and simultaneously, control the compensator so as not to perform frequency offset compensation.

6. The optical receiver according to claim 1, further comprising:
    a variable local oscillator source configured to vary the frequency of the local oscillator light in a predetermined range and sweep the frequency of the local oscillator light at a prescribed step size within said predetermined range,
    wherein the frequency analyzer performs beat detection on each of the swept frequencies, and
    wherein the variable local oscillator source outputs the local oscillator light at a frequency at which the beat frequency is detected.

7. The optical receiver according to claim 1, wherein the frequency analyzer performs acquirement of the digitally sampled data and the frequency analysis twice to determine a direction of the frequency offset of the local oscillator light represented by the beat frequency.

8. The optical receiver according to claim 1, wherein the frequency analyzer detects the beat frequency when a frequency analysis result exceeds a prescribed threshold.

9. The optical receiver according to claim 8, further comprising:
    a monitor configured to monitor a power level of the received light signal,
    wherein the frequency analyzer selects the threshold from a table in which multiple thresholds are associated with at least one of the power level of the received light signal, the beat frequency, a power level of the local oscillator light, and a gain at the wave detector, or from an approximate expression defining a relationship among parameters in the table.

* * * * *